United States Patent
Taguchi et al.

(10) Patent No.: US 9,829,613 B2
(45) Date of Patent: Nov. 28, 2017

(54) HEAT RAY CUTTING FILM AND METHOD FOR PRODUCING SAME, AND LAMINATED GLASS AND HEAT RAY CUTTING MEMBER

(71) Applicant: FUJIFILM Corporation, Tokyo (JP)

(72) Inventors: Takao Taguchi, Ashigarakami-gun (JP); Shunya Katoh, Ashigarakami-gun (JP); Kazuhiro Oki, Ashigarakami-gun (JP); Masaru Yoshikawa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 63 days.

(21) Appl. No.: 14/660,263

(22) Filed: Mar. 17, 2015

(65) Prior Publication Data
US 2015/0192715 A1    Jul. 9, 2015

Related U.S. Application Data

(63) Continuation of application No. PCT/JP2013/073881, filed on Sep. 5, 2013.

(30) Foreign Application Priority Data

Sep. 18, 2012    (JP) .................................. 2012-204198

(51) Int. Cl.
  *C09K 19/00* (2006.01)
  *G02B 5/20* (2006.01)
  (Continued)

(52) U.S. Cl.
  CPC ........ G02B 5/208 (2013.01); B32B 17/10036 (2013.01); B32B 17/10458 (2013.01);
  (Continued)

(58) Field of Classification Search
  CPC .......... G02B 5/208; G02B 5/26; G02B 5/206; G02B 5/3016; G02B 5/0841;
  (Continued)

(56) References Cited

U.S. PATENT DOCUMENTS

| | | |
|---|---|---|
| 7,652,736 B2 | 1/2010 | Padiyath et al. |
| 2007/0109673 A1 | 5/2007 | Padiyath et al. |

(Continued)

FOREIGN PATENT DOCUMENTS

| | | |
|---|---|---|
| CN | 101291804 A | 10/2008 |
| JP | 2009-514022 A | 4/2009 |

(Continued)

OTHER PUBLICATIONS

Chinese Office Action and Search Report, dated May 27, 2016, for corresponding Chinese Application No. 201380047833.7.

(Continued)

*Primary Examiner* — Ruiyun Zhang
(74) *Attorney, Agent, or Firm* — Birch, Stewart, Kolasch & Birch, LLP

(57) ABSTRACT

The present invention provides a heat ray cutting film comprising, on a substrate, at least two layers of a light reflecting layer X1 and a light reflecting layer X2 obtained by fixing cholesteric liquid crystalline phases, and an infrared ray absorbing layer comprising composite tungsten oxide microparticles, wherein the light reflecting layer X1 and the light reflecting layer X2 reflect lights circularly polarized in directions opposite to each other, reflection center wavelengths of the light reflecting layer X1 and the light reflecting layer X2 are within a range of 800 to 1100 nm and are substantially equal to each other, and total reflectivity of all light reflecting layers obtained by fixing cholesteric liquid crystalline phases is 80% or more. The heat ray cutting film of the present invention has high transparency and high heat shielding performance.

16 Claims, 1 Drawing Sheet

(51) Int. Cl.
*G02B 5/30* (2006.01)
*B32B 17/10* (2006.01)
(52) U.S. Cl.
CPC .. *B32B 17/10633* (2013.01); *B32B 17/10678* (2013.01); *B32B 17/10761* (2013.01); *G02B 5/206* (2013.01); *G02B 5/3016* (2013.01); *Y10T 428/1036* (2015.01); *Y10T 428/1086* (2015.01)
(58) Field of Classification Search
CPC ......... G02B 5/0866; B32B 7/02; B32B 17/10; B32B 17/10458; B32B 17/10761; B32B 17/10036; Y10T 428/2848; Y10T 428/1036; Y10T 428/1086
USPC ............ 428/1.3, 1.6, 354, 332; 349/98, 104; 427/163.1, 163.4, 553; 359/359
See application file for complete search history.

(56) References Cited

U.S. PATENT DOCUMENTS

| 2011/0181820 | A1 | 7/2011 | Watanabe |
| 2012/0088037 | A1* | 4/2012 | Oki ........................ G02B 5/208 427/553 |
| 2012/0094118 | A1 | 4/2012 | Oki et al. |

FOREIGN PATENT DOCUMENTS

| JP | 2009-227938 A | 10/2009 |
| JP | 2009227938 A * | 10/2009 |
| JP | 2010-286644 A | 12/2010 |
| JP | 2011-18037 A | 1/2011 |
| JP | 2011-154215 A | 8/2011 |
| WO | WO 2007/050433 A1 | 5/2007 |

OTHER PUBLICATIONS

English translation of Chinese Office Action, dated May 27, 2016, for Chinese Application No. 201380047833.7.
Japanese Office Action dated Nov. 10, 2015, for Japanese Application No. 2012-204198 with the English translation.
Extended European Search Report for European Application No. 13838930.9, dated Mar. 18, 2016.
International Preliminary Report on Patentability and Written Opinion of the International Searching Authority (forms PCT/IB/338, PCT/IB/373, PCT/ISA/237 and PCT/IB/326), dated Apr. 2, 2015, for International Application No. PCT/JP2013/073881, with an English translation of the Written Opinion.
International Search Report, issued in PCT/JP2013/073881, dated Nov. 5, 2013.
Written Opinion of the International Searching Authority, issued in PCT/JP2013/073881, dated Nov. 5, 2013.
The State Intellectual Property Office of People's Republic of China, "The Second Office Action," issued in connection with Chinese Patent Application No. 201380047833.7, dated Feb. 7, 2017.
Chinese Office Action issued in corresponding Chinese Application No. 201380047833.7 dated Aug. 9, 2017 with English Machine Translation.

* cited by examiner

HEAT RAY CUTTING FILM AND METHOD FOR PRODUCING SAME, AND LAMINATED GLASS AND HEAT RAY CUTTING MEMBER

CROSS-REFERENCE TO RELATED APPLICATIONS

The present application is a continuation of PCT/JP2013/073881 filed on Sep. 5, 2013, which claims priority to Japanese Patent Application No. 2012-204198 filed on Sep. 18, 2012, the entire contents of which are incorporated by reference into the present application.

TECHNICAL FIELD

The present invention relates to a heat ray cutting film which has a plurality of light reflecting layers obtained by fixing a cholesteric liquid crystalline phase and which is mainly used for heat shielding of windows of buildings, vehicles and the like, and to a method for producing the same. Furthermore, the present invention relates to infrared light reflective laminated glass and a heat ray cutting member, which utilize the heat ray cutting film.

BACKGROUND ART

Recently, because of the increase of interest in environments and energies, needs for industrial products relative to energy conservation are high, and as one of these, glass and a film which are effective in heat shielding of window glass of houses, automobiles or the like, that is, in reducing a heat load caused by sunlight are required. In order to reduce a heat load caused by sunlight, it is necessary to prevent the transmission of sunbeam in either the visible light region or the infrared region in the sunlight spectrum.

A glass frequently used as an ecoglass having a high heat insulating/heat shielding properties is a multi-layered glass referred to as a Low-E pair glass with a coating of a special metal film that shields a heat ray. The special metal film can be made by laminating plural layers, for example, by a vacuum film forming method. The coating of these special metal films, which is made by vacuum film forming, is remarkably excellent in reflection performance, but a vacuum process has low productivity and leads to high production cost. Furthermore, since the use of a metal film simultaneously results in the shielding of electromagnetic waves, there are problems in which electromagnetic interference is caused in the use of mobile phones or the like and ETC can not be used when the film is used for automobiles.

In contrast to this, a method of selectively reflecting infrared ray through the use of a cholesteric liquid crystal described in Patent Literature 1 is known, and since in the method described in Patent Literature 1 only infrared rays can reflected, the problem of the shielding of electromagnetic waves can be solved.

However, when trying to cut infrared rays over a broad zone only by a cholesteric liquid crystal, the number of layers to be laminated becomes large because the width of selective reflection wavelength by a cholesteric liquid crystal is narrow. In addition, in the case of cutting wavelengths on a long wavelength side (1200 to 2000 nm) by the selective reflection of a cholesteric liquid crystal, a large film thickness is needed, to thereby raise material cost in the actual circumstances. For example, in Patent Literature 1, 4 or more cholesteric reflecting layers and a layer containing a metal oxide that absorbs 1400 to 2500 nm are provided by application and 5-time applications were necessary at this point. Note that, in order to furthermore improve heat shielding performance in the configuration in Patent Literature 1, a reflecting layer that furthermore reflects wavelengths of less than 1400 nm is necessary and, in that case, 6 or more applications become necessary.

Furthermore, in Patent Literature 2, an infrared absorbing material formed by combining a cholesteric liquid crystal layer and a tungsten oxide compound is described.

CITATION LIST

Patent Literature

[Patent Literature 1] Japanese Patent Laid-Open No. 2011-154215
[Patent Literature 2] Japanese Patent Laid-Open No. 2009-227938

SUMMARY OF INVENTION

However, the present inventor has examined the infrared absorbing material described in Patent Literature 2 and has found that the cholesteric liquid crystal layer is only provided for a red color-reflecting layer in order to cancel out blue hue exhibited by the tungsten oxide compound and has a reflecting zone of extremely short wavelengths. Therefore, it has been found that an improvement is required in that the reflection or absorption of near infrared light is insufficient as a heat ray cutting film thereby not to exhibit the heat shielding performance sufficiently.

An object of the present invention is to provide a heat ray cutting film having a high transparency and high heat shielding performance. Furthermore, an object is to provide a method for producing a heat ray cutting film, which can produce a heat ray cutting film that satisfies above-described properties, by a layer configuration with small application times and material cost.

As a result of intensive work by the present inventor for solving the problem, it has been found that a heat ray cutting film having a high transparency and high heat shielding performance while reducing the use amount of a liquid crystal material and application times can be provided by adopting a configuration such that a cholesteric liquid crystal reflects only a wavelength zone having a high weighting coefficient and a tungsten oxide infrared absorbing material having a high infrared absorbing capacity absorbs remaining infrared regions.

The present inventions of a technique for solving the above-described problem are as follows.

[1] A heat ray cutting film having, on a substrate, at least two layers of a light reflecting layer X1 and a light reflecting layer X2 obtained by fixing, respectively, cholesteric liquid crystalline phases, and an infrared ray absorbing layer containing composite tungsten oxide microparticles, wherein the light reflecting layer X1 and the light reflecting layer X2 reflect, respectively, lights circularly polarized in directions opposite to each other, reflection center wavelengths of the light reflecting layer X1 and the light reflecting layer X2 are within a range of 800 to 1100 nm and are substantially equal to each other, and total reflectivity of all light reflecting layers obtained by fixing cholesteric liquid crystalline phases is 80% or more.

[2] In the heat ray cutting film described in [1], the heat ray cutting film preferably has a visible light transmittance of 70% or more and transmittance at 850 nm of 10% or less.

[3] In the heat ray cutting film described in [1] or [2], preferably the light reflecting layer X1 contains a dextrorotary chiral agent and the light reflecting layer X2 contains a levorotatory chiral agent.

[4] In the heat ray cutting film described in any one of [1] to [3], preferably the substrate is a plastic substrate.

[5] In the heat ray cutting film described in any one of [1] to [4], preferably the light reflecting layer X1 is a layer formed by bringing a liquid crystal composition applied on a rubbed plastic substrate to a cholesteric liquid crystalline phase and by fixing the cholesteric liquid crystalline phase by ultraviolet ray irradiation, and the light reflecting layer X2 is a layer formed by bringing a liquid crystal composition applied on the surface of the light reflecting layer X1 to a cholesteric liquid crystalline phase and by fixing the cholesteric liquid crystalline phase by ultraviolet ray irradiation.

[6] In the heat ray cutting film described in any one of [1] to [5], preferably the composite tungsten oxide is represented by a general formula (1) below.

$$M_xWO_y \qquad \text{general formula (1)}$$

(M represents at least one kind selected from the group consisting of Cs, Na, Rb, K, Tl, In, Ba, Li, Ca, Sr, Fe and Sn, $0.1 \leq x \leq 0.5$, and $2.2 \leq y \leq 3.0$)

[7] In the heat ray cutting film described in any one of [1] to [6], preferably the average particle diameter of the composite tungsten oxide microparticles is 5 to 500 nm.

[8] In the heat ray cutting film described in any one of [1] to [7], preferably the infrared ray absorbing layer is a layer obtained by dispersing the composite tungsten oxide microparticles in an ultraviolet curable resin or a thermoplastic resin.

[9] In the heat ray cutting film described in any one of [1] to [8], preferably the infrared ray absorbing layer is formed by an application.

[10] In the heat ray cutting film described in any one of [1] to [9], preferably the infrared ray absorbing layer contains at least one kind of an IR pigment, a color tone adjusting agent, a UV absorber, a light stabilizer and an oxidation inhibitor.

[11] The heat ray cutting film described in any one of [1] to [10] preferably has haze of 1% or less.

[12] In the heat ray cutting film described in any one of [1] to [11], preferably the heat ray cutting film further has an ultraviolet ray reflecting layer obtained by fixing a cholesteric liquid crystalline phase.

[13] In the heat ray cutting film described in any one of [1] to [12], preferably the heat ray cutting film further has at least one kind of an easily adhering layer, a hard coat layer, an ultraviolet ray absorbing layer, a sticky layer and a surface protective layer.

[14] In the heat ray cutting film described in [13], preferably the easily adhering layer contains polyvinyl butyral resin.

[15] In the heat ray cutting film described in [13] or [14], the easily adhering layer contains at least one kind of ultraviolet ray absorbers.

[16] A method for producing the heat ray cutting film described in [1], including the steps of forming, by an application, a light reflecting layer X1 obtained by fixing a cholesteric liquid crystalline phase on a surface of a substrate, forming, by an application, a light reflecting layer X2 obtained by fixing a cholesteric liquid crystalline phase on the light reflecting layer X1 side of the substrate having the light reflecting layer X1, and forming an infrared ray absorbing layer on the light reflecting layer X2 side of the substrate having the light reflecting layer X1 and the light reflecting layer X2 by applying an application liquid containing composite tungsten oxide microparticles.

[17] The method for producing a heat ray cutting film described in [16], including the step of forming the light reflecting layer X2 by an application on the light reflecting layer X1 side of the substrate having the light reflecting layer X1 via another light reflecting layer X3.

[18] The method for producing a heat ray cutting film described in [16], including the steps of forming, by an application, the light reflecting layer X2 on a surface of the light reflecting layer X1 of the substrate having the light reflecting layer X1, and further forming, by an application, another light reflecting layer X3 between the light reflecting layer X2 and the infrared ray absorbing layer.

[19] In the method for producing a heat ray cutting film described in any one of [16] to [18], the step of forming the light reflecting layer X1 by an application and the step of forming the light reflecting layer X2 by an application preferably includes the steps of applying a curable liquid crystal composition containing a curable cholesteric liquid crystal compound onto a surface of the substrate, drying the applied curable liquid crystal composition to thereby align the curable cholesteric liquid crystal compound into a state of a cholesteric liquid crystalline phase, and progressing a curing reaction of the curable liquid crystal composition to thereby fix the cholesteric liquid crystalline phase.

[20] A laminated glass having two glass plates and the heat ray cutting film described in any one of [1] to [15] sandwiched between the two glass plates.

[21] A heat ray cutting member that contains the heat ray cutting film described in any one of [1] to [15] and is used for being stuck to a window of buildings or vehicles.

[22] A heat ray cutting member that contains the heat ray cutting film described in any one of [1] to [15] and is used for a front glass of vehicles.

Effect of the Invention

According to the present invention, a heat ray cutting film having a high transparency and high heat shielding performance can be provided.

MODES OF CARRYING OUT INVENTION

Figure 1:
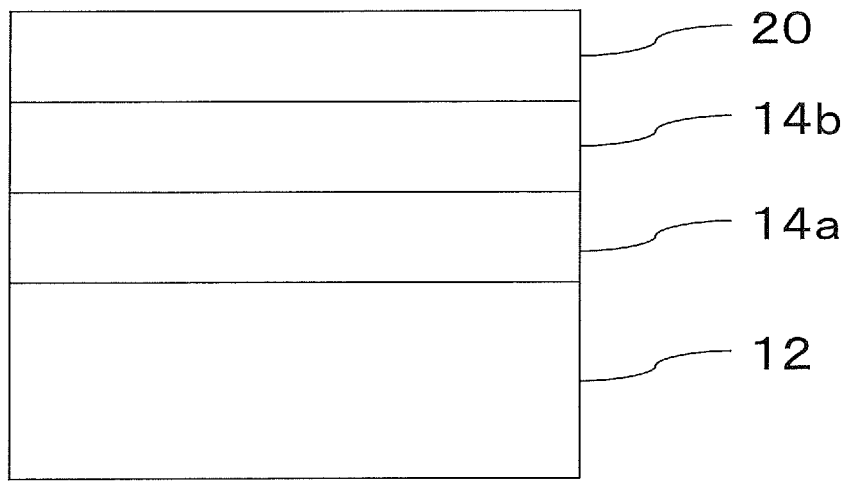
FIG. 1 is a schematic cross-sectional view of an example of the heat ray cutting film of the present invention.

Hereinafter, the present invention will be explained in detail. The explanation of configuration requirements to be described below may be done on the basis of representative embodiments of the present invention, but the present invention is not limited to such embodiments. Not that a numerical range represented using "to" means a range that includes, as the lower limit and the upper limit, numerical values described before and after the "to". Note that, in the present description, a laminated body sandwiched by glass plates means a product that is obtained by laminating glass plate/intermediate film/infrared light reflecting layer (or heat ray cutting film)/intermediate film/glass plate in this order and means a product in a state before pressure bonding with heating. Furthermore, a laminated glass means a product obtained by pressure-bonding, with heating, the laminated body sandwiched by glass plates.

Moreover, in the present description, the refractive index anisotropy Δn of a layer obtained by fixing a cholesteric liquid crystalline phase (light reflecting layer) is defined as follows.

In the present description, the refractive index anisotropy Δn of a layer formed by fixing a cholesteric liquid crystalline phase means Δn at a wavelength exhibiting a selective reflection property (specifically, near the wavelength of 1000 nm). Specifically, first, as a sample, a layer obtained by fixing a cholesteric liquid crystalline phase in which helix axes are uniformly aligned relative to the film face is formed on a substrate subjected to alignment processing, or a substrate (glass, film) to which an alignment film is imparted. The selective reflection of the layer is measured and the peak width Hw thereof is obtained. In addition, a helical pitch of the sample is separately measured. The helical pitch may be measured by performing cross-section TEM observation. These values are substituted into a formula below and the refractive index anisotropy Δn of the sample can be obtained.

$$\Delta n = Hw/p$$

Furthermore, in the present description, a "reflection center wavelength" means a wavelength that exhibits the largest peak of the reflection spectrum measured from the front direction (substantially, directions within five degrees from the front).

Moreover, in the present description, as to "reflection center wavelengths are substantially equal (to each other)" for respective layers, it is needless to say that errors generally allowed in the technical field to which the present invention belongs are also considered. Generally, as to reflection center wavelengths, a difference of about ±30 nm is considered to be substantially equal, a difference within ±20 nm is preferable, and a difference within ±10 nm is more preferable.

[Heat Ray Cutting Film]

The heat ray cutting film of the present invention has, on a substrate, at least two layers of a light reflecting layer X1 and a light reflecting layer X2 obtained by fixing cholesteric liquid crystalline phases, and an infrared ray absorbing layer containing composite tungsten oxide microparticles, wherein the light reflecting layer X1 and the light reflecting layer X2 reflect, respectively, lights circularly polarized in directions opposite to each other, reflection center wavelengths of the light reflecting layer X1 and the light reflecting layer X2 are within a range of 800 to 1100 nm and are substantially equal to each other, and total reflectivity of all light reflecting layers obtained by fixing cholesteric liquid crystalline phases is 80% or more. With such a configuration, a heat ray cutting film having a high transparency and high heat shielding performance can be provided.

Hereinafter, preferable embodiments of the present invention will be described.

<Configuration of Heat Ray Cutting Film>

The infrared light reflecting layer of the present invention is characterized by having a light reflecting layer obtained by fixing a cholesteric liquid crystalline phase. The number of lamination of light reflecting layers obtained by fixing a cholesteric liquid crystalline phase is not particularly limited as long as the number of the light reflecting layers is 2 or more, and for example, can be set to be 2 to 10, is preferably 2 to 8 and is more preferably 2 to 6. From the viewpoint of reducing the number of liquid crystal layers for reflecting infrared light of 1200 to 2000 nm and using an infrared ray absorbing layer containing composite tungsten microparticles to thereby lower haze, 2 to 4 layers are particularly preferable, 2 or 3 layers are more particularly preferable and 3 layers are furthermore particularly preferable.

A substrate, at least two layers of the light reflecting layer X1 and the light reflecting layer X2 obtained by fixing cholesteric liquid crystalline phases are preferably laminated in this order from the substrate side.

The heat ray cutting film of the present invention may have a configuration in which a light reflecting layer is laminated on only one surface of the substrate, or a configuration in which light reflecting layers are laminated on both surfaces of the substrate.

It is also a preferable embodiment of the heat ray cutting film of the present invention that two pairs of heat ray cutting films in which the light reflecting layer is laminated only one surface of a substrate are laminated on both surfaces of another substrate and, in this case, the other substrate is preferably an optically-anisotropic layer having a phase difference of ½ wavelength. Furthermore, in this case, it is more preferable to peel the substrates from the formed heat ray cutting film to thereby give such a configuration as light reflecting layer/optically-anisotropic layer having a phase difference of ½ wavelength/light reflecting layer.

The heat ray cutting film of the present invention may be integrated with another supporting member such as a laminated glass, and used. At this time, also the substrate with the light reflecting layer may be integrated with another supporting member, or the substrate may be peeled off and the light reflecting layer may be integrated with a supporting member.

Hereinafter, preferable embodiments of the heat ray cutting film of the present invention will be explained using the drawings. However, the embodiment of the cholesteric liquid crystal layers of the heat ray cutting film of the present invention is not limited to the forms shown in FIGS. 1 and 2.

The heat ray cutting film shown in FIG. 1 has, on one surface of a substrate 12, the light reflecting layer X1 (hereinafter, also referred to as a light reflecting layer 14a) and a light reflecting layer X2 (hereinafter, also referred to as a light reflecting layer 14b) obtained by fixing cholesteric liquid crystalline phases respectively, and an infrared ray absorbing layer 20. However, although, in the present invention, the lamination order of the light reflecting layers 14a and 14b and the infrared ray absorbing layer 20 from the substrate 12 is limited to this order, another layer or other layers may be additionally contained between respective layers and heat ray cutting films having a lamination order other than the order described in FIG. 1 are also included in the present invention.

For example, in the heat ray cutting film of the present invention, the above-mentioned light reflecting layer X2 may be provided on the above-mentioned light reflecting layer X1 side of the substrate via another light reflecting layer X3.

Furthermore, in the heat ray cutting film of the present invention, the above-mentioned light reflecting layer X2 may be provided adjacent to the above-mentioned light reflecting layer X1 side, and another light reflecting layer X3 may be further provided between the above-mentioned light reflecting layer X2 and the above-mentioned infrared ray absorbing layer.

Figure 2:
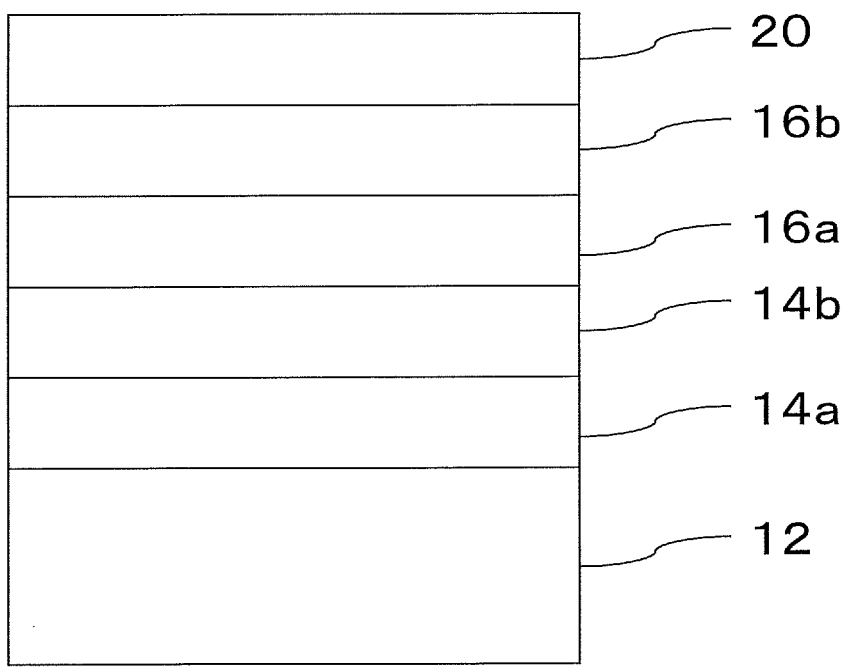
FIG. 2 is a schematic cross-sectional view of another example of the heat ray cutting film of the present invention.

The above-mentioned light reflecting layer X3 may be of one layer, or of two or more layers. In FIG. 2, a cross-sectional view of a heat ray cutting film of another embodiment of the present invention is shown. The heat ray cutting film shown in FIG. 2 has, on one surface of the substrate 12, the light reflecting layer X1 (light reflecting layer 14a), the light reflecting layer X2 (light reflecting layer 14b), the light reflecting layer X3 (light reflecting layer 16a) and the light reflecting layer X3 (light reflecting layer 16b). Here, the light reflecting layers X3, that is, the light reflecting layers 16b, having two layers each preferably has a reflection center wavelength substantially equal to that of the light reflecting layer 16a and has a helix direction of a cholesteric liquid crystalline phase opposite to each other.

Among these embodiments of the heat ray cutting film of the present invention, an embodiment in which the light reflecting layer X2 is provided on the light reflecting layer X1 side of the substrate via another light reflecting layer X3 is preferable, an embodiment in which the light reflecting layer X2 is provided on the light reflecting layer X1 side of the substrate via another light reflecting layer X3 including one layer is more preferable, and an embodiment in which the substrate, the light reflecting layer X1, the light reflecting layer X3 including one layer and the light reflecting layer X2 are provided adjacent to each other, in this order is particularly preferable.

(Other Embodiments)

Moreover, the heat ray cutting film of the present invention may be used, naturally, in combination with another heat ray cutting film other than the infrared ray absorbing layer containing composite tungsten oxide microparticles for the purpose of broadening the reflection wavelength zone. In addition, the heat ray cutting film may have a light reflecting layer that reflects a light having a prescribed wavelength on the basis of a principle other than the selective reflection property of a cholesteric liquid crystalline phase. Examples of members that can be combined include a composite film and respective layers configuring the same described in Published Japanese translation of PCT patent application No. 04-504555, a multilayer laminate described in Published Japanese translation of PCT patent application No. 2008-545556, and the like.

Furthermore, the heat ray cutting film of the present invention may also have a selective reflection property corresponding to respective wavelengths, for example, for 1400 to 2500 nm. For example, the selective reflectivity wavelength region can be broadened and thus heat shielding performance is further enhanced, by further laminating a light reflecting layer obtained by fixing a cholesteric liquid crystalline phase, in particular, light reflecting layers obtained by fixing cholesteric liquid crystalline phases having optical rotations opposite to each other (that is, dextrorotary or levorotary).

<Features of Heat Ray Cutting Film>

(Visible Light Transmittance)

In the heat ray cutting film of the present invention, the visible light transmittance of the heat ray cutting film is preferably 70% or more, more preferably 72% or more, and particularly preferably 74% or more.

(Transmittance at 850 nm)

In the heat ray cutting film of the present invention, the transmittance at 850 nm is preferably 10% or less, more preferably 5% or less, and particularly preferably 3% or less.

(Haze)

In the heat ray cutting film of the present invention, the haze is preferably 1% or less, more preferably 0.8% or less, and particularly preferably 0.7% or less.

(Light Reflecting Layer)

The heat ray cutting film of the present invention has at least two layers of a light reflecting layer X1 and a light reflecting layer X2 obtained by fixing cholesteric liquid crystalline phases, wherein the light reflecting layer X1 and the light reflecting layer X2 reflect, respectively, circularly polarized lights in directions opposite to each other, reflection center wavelengths of the light reflecting layer X1 and the light reflecting layer X2 are within a range of 800 to 1100 nm and are substantially equal to each other, and the reflectivity of all light reflecting layers obtained by fixing cholesteric liquid crystalline phases is 80% or more.

In the heat ray cutting film of the present invention, the reflectivity of the light reflecting layer obtained by fixing a cholesteric liquid crystalline phase is 80% or more, preferably 85% or more, and more preferably 90% or more.

The heat ray cutting film of the present invention has the light reflecting layer X1 and the light reflecting layer X2 each obtained by fixing a cholesteric liquid crystalline phase, wherein the light reflecting layer X1 and the light reflecting layer X2 reflect, respectively, circularly polarized lights in directions opposite to each other, and reflection center wavelengths of the light reflecting layer X1 and the light reflecting layer X2 are within a range of 800 to 1100 nm and are substantially equal to each other.

No particular limitation is imposed on the embodiment in which the light reflecting layer X1 and the light reflecting layer X2 reflect lights circularly polarized in directions opposite to each other, but in the heat ray cutting film of the present invention, preferably the light reflecting layer X1 contains a dextrorotary chiral agent and the light reflecting layer X2 contains a levorotatory chiral agent.

When the heat ray cutting film of the present invention furthermore has the light reflecting layer X3, the reflection center wavelength of the light reflecting layer X3 is preferably within a range of 800 to 1400 nm. In particular, when the light reflecting layer X3 is made of a single layer (for example, in an embodiment in which the substrate, the light reflecting layer X1, the light reflecting layer X3 made of a single layer and the light reflecting layer X2 are provided in this order adjacently to each other), the light reflecting layer X3 preferably has a reflection center wavelength within a range of 800 to 1100 nm and preferably can reflect a circularly polarized light in the same direction as that in the case of the light reflecting layer X1.

In addition, the thickness of each of light reflecting layers is about 1 μm to 8 μm (preferably about 3 to 7 μm). However, the thickness is not limited to these ranges. A light reflecting layer with an intended helical pitch can be formed by adjusting the kind of materials (mainly a liquid crystal material and a chiral agent) used for forming a layer, the concentration thereof, and the like. Furthermore, the thickness of a layer can be set to be within an intended range by adjusting a application amount.

—Materials for Forming Light Reflecting Layer—

In the heat ray cutting film of the present invention, the use of a curable liquid crystal composition is preferable for forming each of light reflecting layers. As an example of the liquid crystal composition, an embodiment of containing at least a rod-like liquid crystal compound, an optically active compound (chiral agent) and a polymerization initiator is preferable. Each component may be included in two or more kinds. In addition, the combined use of a polymerizable liquid crystal compound and a non-polymerizable liquid crystal compound is possible. Furthermore, the combined use of a low-molecular-weight liquid crystal compound and a high-molecular-weight liquid crystal compound is also possible. Furthermore, in order to improve the uniformity of alignment, application suitability or film strength, at least one selected from various additives such as a horizontal alignment agent, an unevenness inhibitor, a repelling inhibitor and a polymerizable monomer may be contained. Moreover, if necessary, a polymerization inhibitor, an oxidation inhibitor, an ultraviolet ray absorber, a light stabilizer, a coloring material, a metal oxide microparticles or the like can be added to the liquid crystal composition, in a range not lowering optical performance.

(1) Liquid Crystal Compound

A liquid crystal compound usable in the present invention may be so-called a rod-like liquid crystal compound or dicotic liquid crystal compound and is not particularly limited. Among these, a rod-like liquid crystal compound is preferable.

An example of the rod-like liquid crystal compound usable in the present invention is a rod-like nematic liquid crystal compound. Examples of rod-like nematic liquid crystal compounds preferably used include azomethines, azoxys, cyanobiphenyls, cyanophenyl esters, benzoic esters, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles. Not only a low-molecular-weight crystal compound but also a high-molecular-weight liquid crystal compound can also be used.

A rod-like liquid crystal compound to be used in the present invention may be polymerizable or may be non-polymerizable. Rod-like liquid crystal compounds having no polymerizable group are described in various literatures (for example, Y. Goto et. al., Mol. Cryst. Liq. Cryst. 1995, Vol. 260, pp. 23-28).

Polymerizable rod-like liquid crystal compounds can be obtained by introducing a polymerizable group in rod-like liquid crystal compounds. Examples of polymerizable groups include unsaturated polymerizable groups, an epoxy group and an aziridinyl group, among which unsaturated polymerizable groups are preferable and an ethylenically unsaturated polymerizable group is particularly preferable. A polymerizable group can be introduced into a molecule of a rod-like liquid crystal compound by various methods. The number of polymerizable groups which a polymerizable rod-like liquid crystal compound has is preferably 1 to 6, more preferably 1 to 3. Examples of polymerizable rod-like liquid crystal compounds include compounds described in Makromol. Chem., Vol. 190, p 2255 (1989), Advanced Materials Vol. 5, p 107 (1993), U.S. Pat. Nos. 4,683,327, 5,622,648 and 5770107, International Publication Nos. WO 95/22586, 95/24455, 97/00600, 98/23580 and 98/52905, Japanese Patent Laid-Open Nos. 01-272551, 06-16616, 07-110469, 11-80081 and 2001-328973, and the like. Two or more kinds of polymerizable rod-like liquid crystal compounds may be simultaneously used. The simultaneous use of two or more kinds of polymerizable rod-like liquid crystal compounds can lower the alignment temperature.

(2) Optically Active Compound (Chiral Agent)

The above-described liquid crystal composition is one that exhibits a cholesteric liquid crystalline phase, and for that purpose, preferably the composition contains an optically active compound. However, when the above-described rod-like liquid crystal compound is a molecule having an asymmetric carbon atom, even when no optically active compound is added, there may be a case where a cholesteric liquid crystalline phase can be stably formed. The above-described optically active compound can be selected from various known chiral agents (for example, described in Liquid Crystal Device Handbook, Chap. 3, Section 4-3, Chiral Agents for TN, STN, p 199, edited by Japan Society for the Promotion of Science, Board 142, 1989). Optically active compounds generally contain an asymmetric carbon atom, but axially asymmetric compounds or planarly asymmetric compounds containing no asymmetric carbon atom can also be used as a chiral agent. Examples of axially asymmetric compounds or planarly asymmetric compounds include binaphthyl, helicene, paracyclophane and derivatives thereof. Optically active compounds (chiral agents) may have a polymerizable group. When an optically active compound has a polymerizable group and a rod-like liquid crystal compound simultaneously used also has a polymerizable group, a polymer having a repeating unit derived from the rod-like liquid crystal compound and a repeating unit derived from the optically active compound can be formed by a polymerization reaction of the polymerizable optically active compound and the polymerizable rod-like liquid crystal compound. In this embodiment, the polymerizable group which the polymerizable optically active compound has is preferably the same kind of group as the polymerizable group which the polymerizable rod-like liquid crystal compound has. Accordingly, also the polymerizable group of the optically active compound is preferably an unsaturated polymerizable group, an epoxy group or an aziridinyl group, more preferably an unsaturated polymerizable group, and particularly preferably an ethylenically unsaturated polymerizable group.

In addition, the optically active compound may be a liquid crystal compound.

The optically active compound in the liquid crystal composition is preferably 1 to 30 mol % relative to the liquid crystal compound simultaneously used. The optically active compound in many cases does not influence on liquid crystallinity when used in lower amount, and thus lower use amount is preferable. Accordingly, as to the optically active compound used as a chiral agent, a compound having strong twisting force is preferable so as to be capable of achieving a twisted alignment having a desired helical pitch even with a small amount. As chiral agents exhibiting such strong twisting force, for example, chiral agents described in Japanese Patent Laid-Open No. 2003-287623 are included and these can preferably be used in the present invention.

(3) Polymerization Initiator

The liquid crystal composition used for forming the light reflecting layer is preferably a polymerizable liquid crystal composition, and for that purpose, preferably contains a polymerization initiator. In the present invention, since a curing action is progressed by ultraviolet ray irradiation, the polymerization initiator to be used is preferably a photopolymerization initiator capable of initiating a polymerization reaction by ultraviolet ray irradiation. Examples of photopolymerization initiators include α-carbonyl compounds (described in each of U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in each of U.S. Pat. Nos. 3,046,127 and 2,951,758), combination of triarylimidazole dimer and p-aminophenyl ketone (described in U.S. Pat. No. 3,549,367), acridine and phenazine compounds (described in Japanese Patent Laid-Open No. 60-105667, U.S. Pat. No. 4,239,850) and oxadiazole compounds (described in U.S. Pat. No. 4,212,970), and the like.

The use amount of the photopolymerization initiator is preferably 0.1 to 20 mass % of a liquid crystal composition (in the case of an application liquid, solid components), more preferably 1 to 8 mass %.

(4) Alignment Controlling Agent

An alignment controlling agent that contributes to stable or quick formation of a cholesteric liquid crystalline phase may be added to the above-described liquid crystal composition. Examples of alignment controlling agents include fluorine-containing (meth)acrylate-based polymers and compounds represented by general formulae (X1) to (X3) below. Two or more kinds selected from these may be contained. These compounds can reduce the tilt angle of molecules of a liquid crystal compound or can cause the molecules to align substantially horizontally at the air interface of the layer. Note that, in the present description, "horizontal alignment" means that the long axis of a liquid crystal molecule and the film surface are parallel to each other, but strict parallelism is not required, and in the present description, the "horizontal alignment" is assumed to mean an alignment in which the tilt angle formed with the horizontal plane is less than 20 degrees. When liquid crystal compounds are aligned horizontally near the air interface, an alignment defect is hardly generated, and thus transparency in the visible light region becomes high and reflectivity in the infrared region increases. On the other hand, it is not preferable that molecules of a liquid crystal compound are aligned at a large tilt angle, because the helix axis of the cholesteric liquid crystalline phase is shifted from the normal line of the film surface, and thus the reflectivity may lower, or a finger print pattern is generated to thereby show the increase in haze or diffraction properties.

Examples of the fluorine-containing (meth)acrylate-based polymers usable as the alignment controlling agent are described in Japanese Patent Laid-Open No. 2007-272185, paragraphs [0018] to [0043], and the like.

Hereinafter, the general formulae (X1) to (X3) below which are utilizable as an alignment controlling agent will be sequentially explained.

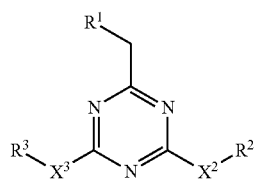
(X1)

In the formula, $R^1$, $R^2$ and $R^3$ each independently represents hydrogen atom or a substituent, $X^1$, $X^2$ and $X^3$ represent a single bond or a divalent linking group. Each of substituents represented by $R^1$ to $R^3$ is preferably a substituted or unsubstituted alkyl group (among these, more preferably an unsubstituted alkyl group or a fluorine-substituted alkyl group), an aryl group (among these, an aryl group having a fluorine-substituted alkyl group is preferable), a substituted or unsubstituted amino group, an alkoxy group, an alkylthio group or a halogen atom. Each of divalent linking groups represented by $X^1$, $X^2$ and $X^3$ is preferably a divalent linking group selected from the group consisting of an alkylene group, an alkenylene group, a divalent aromatic group, a divalent hetero ring residue, —CO—, —NRa- (Ra is an alkyl group having 1 to 5 carbon atoms or hydrogen atom), —O—, —S—, —SO—, —SO$_2$— and combinations thereof. The divalent linking group is more preferably a divalent linking group selected from the group consisting of an alkylene group, a phenylene group, —CO—, —NRa-, —O—, —S— and —SO$_2$— or a divalent linking group obtained by combining at least two groups selected from the group. The number of carbon atoms of the alkylene group is preferably 1 to 12. The number of carbon atoms of the alkenylene group is preferably 2 to 12. The number of carbon atoms of the divalent aromatic group is preferably 6 to 10.

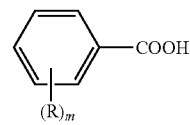
(X2)

In the formula, R represents a substituent and m represents an integer of 0 to 5. When m represents an integer of 2 or more, the plural Rs may be the same or different. Substituents that are preferable as R are the same as those mentioned as the preferable range of substituents represented by $R^1$, $R^2$ and $R^3$. m represents preferably an integer of 1 to 3, and is particularly preferably 2 or 3.

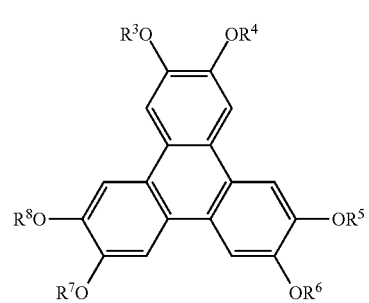
(X3)

In the formula, $R^4$, $R^5$, $R^6$, $R^7$, $R^8$ and $R^9$ each independently represents hydrogen atom or a substituent. Each of the substituents represented by $R^4$, $R^5$, $R^6$, $R^7$, $R^8$ and $R^9$ is preferably the same as those mentioned as preferable substituents represented by $R^1$, $R^2$ and $R^3$ in the general formula (XI).

Examples of compounds represented by the formulae (X1) to (X3) usable as the alignment controlling agent in the present invention include compounds described in Japanese Patent Laid-Open No. 2005-99248.

Note that, in the present invention, as the alignment controlling agent, compounds represented by the general formulae (X1) to (X3) may be used in one kind or in two or more kinds in combination.

The addition amount of the compound represented by any of the general formulae (X1) to (X3) in the liquid crystal composition is preferably 0.01 to 10 mass %, more preferably 0.01~5 mass %, particularly preferably 0.02 to 1 mass % of the mass of the liquid crystal compound.

(Substrate)

The heat ray cutting film of the present invention has a substrate.

The substrate is not limited at all in terms of a material and optical properties, as long as the substrate has self-supporting properties and supports the above-described light reflecting layer. Depending on use applications, high transparency to ultraviolet light will be required.

The substrate (substrate 12 in FIGS. 1, 2, and the like) is, for example, made of a polymer film and optical properties thereof are not particularly limited. In the heat ray cutting film of the present invention, preferably the substrate is a plastic substrate (or a polymer film). In the present invention, in particular, members having in-plane retardation Re with variation may be used as a substrate.

Specifically, optical properties of the substrate 12 are not particularly limited, and the substrate may be an optically-anisotropic layer exhibiting phase difference or an optically-isotropic substrate. Namely, the substrate 12 is unnecessarily an optically-anisotropic layer such as an optically-anisotropic layer having strictly adjusted optical properties such as a phase difference of ½ wavelength. In the present invention, the substrate 12 may be made of a polymer film or the like in which the variation of in-plane retardation Re (1000) at the wavelength of 1000 nm is 20 nm or more. Furthermore, the substrate 12 may be made of a polymer film or the like in which the variation of Re (1000) is 100 nm or more. Moreover, the in-plane retardation of the substrate is not also particularly limited, and for example, an optically-anisotropic layer or the like in which the in-plane retardation Re (1000) at the wavelength of 1000 nm is 800 to 13000 nm, can be used.

Examples of polymer films having high transmission properties for visible light include various polymer films for optical films used as a member of display devices such as a liquid crystal display device. Examples of the substrates include films of polyester such as polyethylene terephthalate (PET), polybutylene terephthalate and polyethylene naphthalate (PEN); polycarbonate (PC) film, polymethyl methacrylate film; films of polyolefine such as polyethylene and polypropylene; polyimide film, triacetyl cellulose (TAC) film, and the like. Polyethylene terephthalate and triacetyl cellulose are preferable.

The substrate may be a special optically-anisotropic layer such as an optically-anisotropic layer having a phase difference of ½ wavelength, which is produced under a management of production process so as to satisfy prescribed optical properties, or a polymer film or the like which cannot be used as a prescribed optically-anisotropic layer. Among these, in the heat ray cutting film of the present invention, preferably the substrate is an optically-anisotropic layer having a phase difference of ½ wavelength. Furthermore, it is preferable to suppress the number of lamination of the light reflecting layer by providing an optically-anisotropic layer having a phase difference of ½ wavelength from the viewpoint of cost and production load and of enhancing optical properties (haze) and an applied surface state. Note that, through the utilization of an optically-anisotropic layer having a phase difference of ½ wavelength, both circularly-polarized lights of right circularly-polarized light and left circularly-polarized light can be reflected only with a light reflecting layer obtained by fixing a cholesteric liquid crystalline phase of one helical direction, and thus cost and production load can be suppressed.

The above-described optically-anisotropic layer having a phase difference of ½ wavelength is not particularly limited and a preferable one can be used after appropriate change, as necessary.

As the optically-anisotropic layer having a phase difference of ½ wavelength, for example, one obtained by stretching a film made of transparent resin can be used. Furthermore, optically-anisotropic layers described in Japanese Patent Laid-Open No. 2002-40258 can also be used as the optically-anisotropic layer having a phase difference of ½ wavelength in the present invention, and the contents described in Japanese Patent Laid-Open No. 2002-40258 can be incorporated to be used in the present invention.

The above-described transparent resin is not particularly limited, but one having a thickness of about 0.1 mm and having total light ray transmittance of 80% or more is preferable. Examples of the above-described transparent resins include acetate-based resins such as triacetyl cellulose, polyester-based resins, polyethersulfone-based resins, polycarbonate-based resins, chain-like polyolefine-based resin, polymer resins having an alicyclic structure, acrylic-based resins, polyvinyl alcohol-based resins, polyvinyl chloride-based resins, and the like. Among them, polycarbonate-based resins or polymer resins having an alicyclic structure are preferable. Examples of polymer resins having an alicyclic structure specifically include (1) norbornene-based polymers, (2) cyclic olefin-based polymers of monocycle type, (3) cyclic conjugated diene-based polymers, (4) vinyl alicyclic hydrocarbon polymers, hydrogenated products thereof, and the like.

Known additives such as an oxidation inhibitor, a heat stabilizer, a light stabilizer, an ultraviolet ray absorber, an antistatic agent, a dispersant, a chlorine scavenger, a flame retardant, a nucleating agent, an antiblocking agent, an antifogging agent, a releasing agent, a pigment, an organic or inorganic filler, a neutralizing agent, a lubricant, a decomposing agent, a metal deactivator, a pollution controlling material, an antimicrobial agent and a thermoplastic elastomer, as necessary, can be added to the above-described resins.

In addition, as the optically-anisotropic layer having a phase difference of ½ wavelength, a product obtained by applying, aligning and fixing a liquid crystal compound on a transparent resin, an inorganic crystal such as quartz or sapphire, or a structural birefringent plate obtained by providing fine unevenness on a resin or glass substrate can also be used.

Instead of glasses that are combined to sandwich the infrared light reflecting layer, glass substitute resin-forming bodies or a combination of a glass substitute resin-forming body and a glass can be used. Examples of glass substitute resins include polycarbonate resins, acrylic-based resins, methacrylic-based resins, and the like. A material in which a glass substitute resin has a coating of a hard coat layer on it can also be used. Examples of hard coat layers include acrylic-based hard coat materials, silicone-based hard coat materials, melamine-based hard coat materials and materials obtained by dispersing inorganic particles such as silica, titania, alumina or zirconia in these hard coat materials.

In a configuration including an optically-anisotropic layer having a phase difference of $\lambda/2$ wavelength in the heat ray cutting film of the present invention, the above-described liquid crystal film obtained by fixing a cholesteric liquid crystalline phase is preferably a laminated body of three layers or more. The configuration results in forming a liquid crystal film obtained by fixing a cholesteric liquid crystalline phase/optically-anisotropic layer having a phase difference of $\lambda/2$ wavelength/liquid crystal film obtained by fixing a cholesteric liquid crystalline phase, to thereby give, as a whole, a laminated body in which six layers or more of the cholesteric liquid crystal are laminated.

(Infrared Absorbing Layer Containing Composite Tungsten Oxide Microparticles)

The heat ray cutting film of the present invention has an infrared ray absorbing layer containing composite tungsten oxide microparticles. With such a configuration, light within the wavelength range of about 1100 to 2500 nm is absorbed and/or reflected, and the heat shielding properties can be further improved.

The embodiment in which heat shielding properties have been improved in this manner by utilizing composite tungsten oxide microparticles is more preferable in terms of production suitability and production cost, as compared with the broadening of the zone by further laminating the light reflecting layer obtained by fixing a cholesteric liquid crystalline phase.

In the heat ray cutting film of the present invention, the composite tungsten oxide is preferably represented by a general formula (1) below.

$$M_xWO_y \qquad \text{general formula (1)}$$

(M represents at least one selected from the group consisting of Cs, Na, Rb, K, Tl, In, Ba, Li, Ca, Sr, Fe and Sn, $0.1 \le x \le 0.5$, and $2.2 \le y \le 3.0$)

W represents tungsten and O represents oxygen.

In particular, among the composite tungsten oxides represented by the general formula (1), a cesium-containing tungsten oxide in which the M element represents Cs is suitable because of high near infrared ray absorption ability.

Furthermore, in the general formula (1), the amount of the M element to be added preferably satisfies the relation of $0.001 \le x/y \le 1.1$ as a value of x/y based on the content of tungsten, and, in particular, x/y near 0.33 is preferable from the viewpoint of exhibiting suitable near infrared absorption ability. In addition, when x/y is near 0.33, the composite tungsten oxide easily has a hexagonal crystal structure, and is also suitable in terms of the durability by having the crystal structure.

Moreover, the content of oxygen in the general formula (1) preferably satisfies the relation of $2.2 \le z/y \le 3.0$ as the z/y value based on the content of tungsten. More specifically, $Cs_{0.33}WO_3$, $Rb_{0.33}WO_3$, $K_{0.33}WO_3$, $Ba_{0.33}WO_3$ and the like can be exemplified.

The above-described inorganic near infrared ray absorbers may be used alone or can also be used in combination of two or more kinds.

In the heat ray cutting film of the present invention, the average particle diameter of the above-described composite tungsten oxide microparticles is preferably 5 to 500 nm, more preferably 10 to 100 nm, and particularly preferably 20 to 50 nm.

Those described in Japanese Patent Laid-Open No. 2009-227938 can be preferably used as the above-described composite tungsten oxide microparticles.

A method for producing the above-described composite tungsten oxide is not particularly limited but any of known methods can be used. For example, intended oxide microparticles can be obtained by using a metal salt or a metal alkoxide as a raw material and hydrolyzing it in a reaction system containing water.

In addition, as methods other than the method of hydrolyzing the raw material in water, inorganic microparticles may be made in an organic solvent or in an organic solvent in which a thermoplastic resin is dissolved. Examples of solvents used for these methods include acetone, 2-butanone, dichloromethane, chloroform, toluene, ethyl acetate, cyclohexanone, anisole, and the like. These may be used alone or by mixing plural kinds.

In the heat ray cutting film of the present invention, the infrared ray absorbing layer preferably is a layer obtained by dispersing the composite tungsten oxide microparticles, in an ultraviolet curable resin or a thermoplastic resin.

In the heat ray cutting film of the present invention, the infrared ray absorbing layer preferably contains at least one of an IR pigment, a color tone adjusting agent, a UV absorber, a light stabilizer and an oxidation inhibitor. Among these, the infrared ray absorbing layer preferably contains a UV absorber, a light stabilizer and an oxidation inhibitor from the viewpoint of light (UV) resistant properties.

A method for producing the infrared ray absorbing layer containing the above-described composite tungsten oxide microparticles is not particularly limited, but a known method can be used.

In the heat ray cutting film of the present invention, the infrared ray absorbing layer is preferably formed by application.

(Other Layers)

Furthermore, the heat ray cutting film of the present invention may have another layer containing an organic material and/or an inorganic material.

The heat ray cutting film of the present invention preferably further includes an ultraviolet ray reflecting layer obtained by fixing a cholesteric liquid crystalline phase. The ultraviolet ray reflecting layer obtained by fixing a cholesteric liquid crystalline phase is the same as the light reflecting layer X1 or the like except that the selective reflectivity wavelength is set within a wavelength region of ultraviolet rays by changing (increasing) the amount of a chiral agent.

Respective light reflecting layers formed by fixing a cholesteric liquid crystalline phase tend to deteriorate by ultraviolet light irradiation, and in particular, deterioration due to ultraviolet rays of 380 nm or shorter in wavelength is remarkable. In the present invention, a layer containing a material that absorbs light within the range (ultraviolet ray absorber) may be arranged, and furthermore, it is preferable to include an ultraviolet ray reflecting layer obtained by fixing a cholesteric liquid crystalline phase, because the deterioration can be suppressed remarkably.

In addition, the heat ray cutting film of the present invention preferably further includes at least one of an easily adhering layer, a hard coat layer, an ultraviolet ray absorbing layer, a sticky layer and a surface protective layer.

The above-described easily adhering layer is a layer for facilitating close adherence to another member (for example, an intermediate film sheet, and the like). The above-described easily adhering layer is preferably arranged as the outermost layer of one or both surfaces. For example, in an embodiment of arranging a light reflecting layer on one surface of a substrate, the easily adhering layer can be arranged on the outermost light reflecting layer. In addition/alternatively, the easily adhering layer can also be arranged on the rear surface of the substrate (the surface of the substrate on the side on which no light reflecting layer is arranged). Materials utilized for forming an easily adhering layer are selected from various materials depending on whether the easily adhering layer is to be formed adjacent to a light reflecting layer or to be formed adjacent to a substrate, or depending on material quality of another member to adhere.

Moreover, other examples of the light non-reflecting layers utilizable in the present invention include: an undercoating layer that enhances an adherence force between a light reflecting layer of a cholesteric liquid crystalline phase and a substrate; and an alignment layer prescribing more precisely the alignment direction of a liquid crystal compound used when forming a light reflecting layer. The undercoating layer and the alignment layer are preferably arranged between the at least one light reflecting layer and the substrate. In addition, the alignment layer may be arranged between light reflecting layers.

—Easily Adhering Layer—

The heat ray cutting film of the present invention may have the easily adhering layer as the outermost layer of one or both surfaces. The easily adhering layer has a function of improving the adhesiveness, for example, to an intermediate film for a laminated glass. More specifically, the easily adhering layer has a function of improving the adhesiveness between a light reflecting layer of a cholesteric liquid crystalline phase and/or a substrate, and an intermediate film for a laminated glass. Materials utilizable for forming an easily adhering layer include polyvinyl butyral (PVB) resin. The polyvinyl butyral resin is a kind of polyvinyl acetal generated by causing polyvinyl alcohol (PVA) and butyl aldehyde to react with each other by using an acid catalyst, and is a resin having a repeating unit shown below.

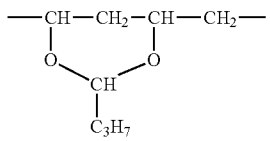

The easily adhering layer is preferably formed by application. For example, the easily adhering layer may be formed by application on the surface of a light reflecting layer of a cholesteric liquid crystalline phase and/or on the rear face of a substrate (surface on the side on which a light reflecting layer is not formed). More specifically, the easily adhering layer can be formed by dissolving one of polyvinyl butyral resins in an organic solvent to thereby prepare an application liquid, by applying the application liquid onto the surface of a light reflecting layer of a cholesteric liquid crystalline phase and/or the rear face of a substrate, and by heating it to be dried. Examples of the solvent to be used for the preparation of the application liquid include methoxy-propylacetate (PGMEA), methyl ethyl ketone (MEK), iso-propanol (IPA) and the like. Conventionally known various methods can be utilized as an application method. As to a temperature in drying, a preferable range varies depending on materials used for preparing the application liquid and, generally, the range is preferably about 140 to 160° C. A drying time is also not particularly limited, but generally, the time is about 5 to 10 minutes.

Furthermore, the easily adhering layer may be a layer including acrylic resin, styrene/acrylic resin, urethane resin, polyester resin or the like, which is referred to as so-called an undercoat layer. The easily adhering layer made of these materials can also be formed by application. Note that, among commercially available polymer films, some may have been given an undercoat, and thus such commercially available products can also be utilized as a substrate.

Note that the thickness of an easily adhering layer is preferably 0.1 to 2.0 μm.

—Undercoating Layer—

The heat ray cutting film of the present invention may have an undercoat ing layer between the light reflecting layer of a cholesteric liquid crystalline phase and the substrate. When the adhesive force between the light reflecting layer of a cholesteric liquid crystalline phase and the substrate is weak, an peeling failure tends to be generated in a production process by laminating light reflecting layers of cholesteric liquid crystalline phases, or the lowering of strength (shock resistance) is caused when the heat ray cutting film is used to form a laminated glass. Accordingly, a layer capable of improving adhesive properties between a cholesteric liquid crystal layer and a substrate can be utilized as an undercoating layer. On the other hand, when peeling the substrate, or the substrate and the undercoating layer and integrating the light reflecting layer with a member such as an intermediate film sheet, such a degree of weakness of adhesive properties that allows the peeling is required at the interface between the substrate and the undercoating layer, or between the undercoating layer and the light reflecting layer of a cholesteric liquid crystalline phase. When considering that a laminated intermediate film sheet is made in a post-process, the peeling at the interface between the undercoating layer and the substrate is more preferable.

Examples of materials utilizable for forming the undercoat include acrylic acid ester copolymers, polyvinyl chloride, styrene-butadiene rubber (SBR), aqueous polyesters, and the like. Furthermore, in an embodiment in which the surface of the undercoating layer adheres to an intermediate film, excellent adhesive properties between the undercoating layer and the intermediate layer are preferable, and from the viewpoint, the undercoating layer preferably contains polyvinyl butyral resin in addition to the above-described materials. Moreover, in the undercoating layer, as described above, the adhesive force is required to be appropriately adjusted, and thus an appropriate use of a hardener such as dialdehydes such as glutaraldehyde and 2,3-dihydroxy-1,4-dioxane or boric acid to harden the film is preferable. The addition amount of the hardener is preferably 0.2 to 3.0 mass % relative to the dry mass of the undercoating layer.

The thickness of the undercoating layer is preferably 0.05 to 0.5 μm.

—Alignment Layer—

The heat ray cutting film of the present invention may have an alignment layer between the light reflecting layer of a cholesteric liquid crystalline phase and the substrate. The alignment layer has a function of prescribing more precisely the alignment direction of liquid crystal compounds in the cholesteric liquid crystal layer. The alignment layer can be provided by techniques such as a rubbing treatment of an organic compound (preferably polymer), oblique evaporation of an inorganic compound, and formation of a layer having micro groves. Moreover, such alignment layers that generate an alignment function by impairment of an electric field, impairment of magnetic field or light irradiation are also known. The alignment layer is preferably formed on a surface of a polymer film by a rubbing treatment.

The alignment layer is required to be adjacent to the light reflecting layer of a cholesteric liquid crystalline phase, the layer is preferably provided between the light reflecting layer of a cholesteric liquid crystalline phase, and the substrate or the undercoating layer. However, the undercoating layer may have the function of an alignment layer. In addition, the alignment layer may be provided between light reflecting layers.

The alignment layer preferably has a certain degree of adhesive force for all of the adjacent light reflecting layers of a cholesteric liquid crystalline phase, and the undercoating layer or the substrate. However, when forming a heat ray cutting film through the sticking to an optically-anisotropic layer having a phase difference of ½ wavelength while peeling the substrate from the light reflecting layer of a cholesteric liquid crystalline phase, which is an example of the embodiment of the present invention to be described later, or when forming a laminated intermediate film sheet, weakness to the extent that the peeling can be carried out between any of interfaces of light reflecting layer of a cholesteric liquid crystalline phase/alignment layer/undercoating layer/substrate is necessary. The interface to be peeled may be an arbitrary interface, but when considering that a laminated intermediate film sheet is to be formed in a post-process, the peeling at the interface of the alignment layer and the undercoating layer is more preferable.

Polymers of an organic compound are preferable as materials used as the alignment layer, and polymers crosslinkable by themselves or polymers to be cross-linked by a cross-linking agent are frequently used. Naturally, polymers having both functions are also used. Examples of polymers can include polymers such as polymethyl methacrylate, acrylic acid/methacrylic acid copolymer, styrene/maleinimide copolymer, polyvinyl alcohol and modified polyvinyl alcohol, poly(N-methylolacrylamide), styrene/vinyltoluene copolymer, chlorosulfonated polyethylene, nitrocellulose, polyvinyl chloride, chlorinated polyolefine, polyester, polyimide, vinyl acetate/vinyl chloride copolymer, ethylene/vinyl acetate copolymer, carboxymethyl cellulose, gelatin, polyethylene, polypropylene and polycarbonate, and compounds such as a silane coupling agent. Examples of preferable polymers can include water-soluble polymers such as poly(N-methylolacrylamide), carboxymethyl cellulose, gelatin, polyvinyl alcohol and modified polyvinyl alcohol, furthermore preferably gelatin, polyvinyl alcohol and modified polyvinyl alcohol, particularly preferably polyvinyl alcohol and modified polyvinyl alcohol. Furthermore, in an embodiment in which the surface of the alignment layer adheres to an intermediate film, adhesive properties between the alignment layer and the intermediate layer is preferably excellent, and from the viewpoint, the alignment layer preferably contains a polyvinyl butyral resin in addition to the above-mentioned materials.

The thickness of the above-mentioned alignment layer is preferably 0.1 to 2.0 µm.

(Additive)

Furthermore, as to the heat shielding effect of the heat ray cutting film of the present invention, the heat shielding effect can also be improved not only by reflection properties but also by light absorption properties of a material. The heat ray cutting film of the present invention may contain an additive in arbitrary layer.

For example, light in the near infrared region can be absorbed and thus the heat shielding properties can be further improved, by adding a coloring material that exhibits absorption properties in a near infrared region, preferably within a wavelength region of about 780 to 940 nm to the substrate or at least one light reflecting layer, or by arranging separately a layer containing the coloring material.

Moreover, from the research by the present inventor, it has been found that each of light reflecting layers obtained by fixing cholesteric liquid crystalline phases tends to deteriorate by ultraviolet light irradiation and the deterioration due to ultraviolet light of 380 nm or shorter in wavelength was remarkable. Accordingly, in the present invention, the deterioration can be preferably suppressed remarkably, for example, by adding a material (ultraviolet ray absorber) absorbing the light in the wavelength region to the substrate or at least one light reflecting layer, or by arranging separately a layer containing the material.

Note that, since the coloring material, metal oxide microparticles, the ultraviolet ray absorber or the like may have an influence on the alignment of a liquid crystal, these materials are preferably added to the substrate or a layer other than the light reflecting layer, or are preferably added to another member when the light reflecting layer is integrated with the another member. These materials may have been added in the same layer, or added respectively in layers different from each other. Members (layer, substrate and the like) to which respective materials are to be added will be determined so that effects based on functions of respective materials can be more effectively obtained. In addition, members to which these materials are to be added will be determined so that a planar failure and the like are not generated and transparency is not lowered remarkably, while considering various properties (influence on haze, solubility, melting properties, application properties) of these materials.

For example, an ultraviolet ray absorber is preferably added to a member which light enters prior to the light reflecting layer. The deterioration of the light reflecting layer due to ultraviolet rays can be suppressed by adding the ultraviolet ray absorber to the member.

Furthermore, a coloring material or metal oxide microparticles are preferably added to a member which light enters later than the light reflecting layer.

Although, not exemplified in the drawings, additives such as an ultraviolet ray absorber, a coloring material and metal oxide microparticles may be contained in an arbitrary layer of the heat ray cutting film of the present invention, in the embodiment of the present invention. Among them, the above-described additive is preferably contained in the above-described substrate or the above-described light non-reflective layer, and for example, the additive is preferably contained in any of the easily adhering layer, the alignment layer, the undercoating layer and the substrate. The layer to which additive is to be added is selected depending on the positional relationship between the light reflecting layer of a cholesteric liquid crystalline phase and the sun light. The ultraviolet ray absorber is preferably contained in a layer on the side closer to the sun light than the light reflecting layer of a cholesteric liquid crystalline phase, and the coloring material and metal oxide microparticles are preferably contained in a layer on the side farther to the sun light than the light reflecting layer of a cholesteric liquid crystalline phase. Depending on embodiments, layers preferable for containing each of the ultraviolet ray absorber, the coloring material and metal oxide microparticles are changed, and thus, as to respective raw materials, it is necessary to appropriately adjust a composition, a solvent, a use amount and the like, and to adopt a method for containing thereof, which is considered to be the best.

(Ultraviolet Ray Absorber)

In the heat ray cutting film of the present invention, it is preferable that an ultraviolet ray absorber is contained in at least one of the light reflecting layer, the easily adhering layer, the undercoating layer, the alignment layer and the substrate. Some kinds of ultraviolet ray absorbers influence the alignment of a liquid crystal, and thus the addition of the ultraviolet ray absorber in a member other than the light reflecting layer (layer, substrate and the like) is preferable. The embodiment of the present invention can adopt various forms, and the addition to a member which light enters prior to the light reflecting layer is preferable. For example, the addition to a layer arranged between a glass plate arranged on the open air side and the light reflecting layer of a cholesteric liquid crystalline phase is preferable. Alternatively, the incorporation in an intermediate film caused to adhere to a glass plate arranged on the open air side, or in the glass itself arranged on the open air side is also preferable.

Examples of compounds usable as the ultraviolet ray absorber include benzotriazole-based, benzodithiol-based, coumarin-based, benzophenone-based, salicylic ester-based and cyanoacrylate-based ultraviolet ray absorbers; titanium oxide and zinc oxide, and the like. Examples of particularly preferable ultraviolet ray absorbers include Tinuvin 326, 328, 479 (all are manufactured by Ciba Japan). In addition, the kind and blending amount of the ultraviolet ray absorber are not particularly limited and can be appropriately selected in accordance with the purpose. In particular, a member containing the ultraviolet ray absorber preferably has a function of making the transmittance of ultraviolet rays having wavelengths of 380 nm or less be 0.1% or less, because the deterioration of the light reflecting layer can be remarkably reduced and yellowing caused by ultraviolet rays can be dramatically reduced. Accordingly, determination of the kind and blending amount of the ultraviolet ray absorber so as to satisfy the above properties is preferable.

(Coloring Material)

The heat ray cutting film of the present invention preferably contains a coloring material in at least one of the light reflecting layer, the easily adhering layer, the undercoating layer, the alignment layer and the substrate. Since some kinds of coloring materials influence the alignment of a liquid crystal, the addition to a member (layer, substrate and the like) other than the light reflecting layer is preferable. Note that, in some cases, diffusion or absorption generated when light passes through a member containing the coloring material lowers the efficiency of infrared light reflection by the light reflecting layer of a cholesteric liquid crystalline phase to thereby lower heat shielding performance. Accordingly, although the embodiment of the present invention can adopt various shapes, the addition to a member which light enters later than the light reflecting layer is preferable. More specifically, it is preferable that the coloring material is contained in a layer arranged between a glass plate arranged on the indoor side and the light reflecting layer of a cholesteric liquid crystalline phase. Alternatively, it is also preferable that the coloring material is contained in an intermediate film which is to be caused to adhere to a glass plate arranged on the indoor side, or a glass plate itself arranged on the indoor side.

Both dye and pigment can be used as the coloring material. Particularly, the use of a material exhibiting absorption properties for a wavelength region of 780 to 940 nm is preferable because it can further improve heat shielding properties. Furthermore, the use of the material is also preferable from the viewpoint of being capable of reducing coloring. Cyan dyes and cyan pigments are preferable as an absorption material for a wavelength region of 780 to 940 nm.

Example of dyes used as a cyan dye include azomethine dyes such as an Indoaniline dye and an indophenol dye; polymethine dyes such as a cyanine dye, an oxonol dye and a merocyanine dye; carbonium dyes such as a diphenylmethane dye, a triphenylmethane dye and a xanthene dye; phthalocyanine dyes; anthraquinone dyes; aryl or heterylazo dyes having, for example, phenols, naphthols or anilines as a coupling component, and indigo/thioindgo dyes. These dyes may be ones that exhibit cyan for the first time when a part of chromophores is dissociated, and a counter cation on this case may be an inorganic cation such as an alkali metal or ammonium, or an organic cation such as pyridinium or quaternary ammonium salt, or, furthermore, a polymer cation having these in a partial structure. In addition, black dyes such as a polyazo dye can also be used.

As examples of pigments used as a cyan pigment, phthalocyanine pigments, anthraquinone-based indanthrone pigments (such as C. I. Pigment Blue 60) and dye-lake pigment-based triarylcarbonime pigments are preferable, in particular, phthalocyanine pigments (preferable examples include copper phthalocyanines such as C. I. Pigment Blue 15:1, 15:2, 15:3, 15:4 and 15:6, pigments described European Patent 860475 regarding monochioro or low chlorinated copper phthalocyanine and aluminum phthalocyanine, metal-free phthalocyanine being C. I. Pigment Blue 16, phthalocyanine having Zn, Ni or Ti as a center metal, among these preferable are C. I. Pigment Blue 15:3 and 15:4, aluminum phthalocyanine) are most preferable.

As described above, the utilization of a coloring material being a light absorbing raw material may generate deviation in a transmittance spectrum of a visible light ray wavelength region and produce color in transmitted light. In some use applications, a coloring material can be selected so as to give an intended color, by positive utilization of the characteristics. On the other hand, in some use applications (such as a front glass of automobiles), the coloring may not be desirable. As a result of the research by the present inventor, it was found that a combined use of an absorbent material having the absorption maximum wavelength of 780 to 940 nm and an absorbent material exhibiting another absorption property made it possible to adjust the color to be neutral. For example, in order to adjust the color of transmitted light of a heat ray cutting film to a neutral direction, together with the above-described cyan dye and/or cyan pigment, another coloring material (yellow dye, yellow pigment, magenta dye, magenta pigment, etc.) is preferably used. Known coloring materials described in various literatures can be utilized as these coloring materials, (Dyes are described in Japanese Patent Laid-Open No. 2005-105175 or the like, and pigments are described in Japanese Patent Laid-Open No. 2009-67956 or the like.)

<Method for Producing Heat Ray Cutting Film>

Each of light reflecting layers in the heat ray cutting film of the present invention can be formed by various methods. An example is a method of forming it by an application to be described later, and more specifically, each of light reflecting layers can be formed by applying a curable liquid crystal composition capable of forming a cholesteric liquid crystalline phase onto a surface of a substrate, an alignment layer, a light reflecting layer or the like, by making the composition into a cholesteric liquid crystalline phase, and after that, by progressing a curing reaction (such as a polymerization reaction or cross-linking reaction) to thereby cure the same.

The heat ray cutting film of the present invention is preferably obtained by an application method.

The method is characterized by including the steps of: forming, by an application, the light reflecting layer X1 obtained by fixing a cholesteric liquid crystalline phase on the surface of the substrate; forming, by an application, the light reflecting layer X2 obtained by fixing a cholesteric liquid crystalline phase on the surface on the light reflecting layer X1 side of the substrate having the light reflecting layer X1; and forming an infrared ray absorbing layer by applying an application liquid containing a composite tungsten oxide microparticles onto the surface on the light reflecting layer X2 side of the substrate having the light reflecting layer X1 and the light reflecting layer X2.

Furthermore, the process of forming the above-described light reflecting layer X1 by an application and the process of forming the above-described light reflecting layer X2 by an application include preferably applying a curable liquid crystal composition containing a curable cholesteric liquid crystal compound onto the surface of the substrate, drying the above-described curable liquid crystal composition applied to thereby align the above-described curable cholesteric liquid crystal compound and align it into a state of a cholesteric liquid crystalline phase, and progressing the curing reaction of the above-described curable liquid crystal composition and fixing a cholesteric liquid crystalline phase.

An example of the production method is a production method including at least:

(1) applying a curable liquid crystal composition onto a surface of a substrate etc. and putting it into a state of a cholesteric liquid crystalline phase, and (2) irradiating the above-described curable liquid crystal composition with ultraviolet rays to thereby progress a curing reaction and fixing a cholesteric liquid crystalline phase to thereby form a light reflecting layer.

A heat ray cutting film having the same configuration as the configuration shown in FIG. 1 can be made by repeating two times the (1) and (2) steps on the one surface of the substrate.

Note that the direction of twisting a cholesteric liquid crystalline phase can be adjusted depending on the kind of a liquid crystal to be used or the kind of a chiral agent to be added, and the helical pitch (that is, the central reflection wavelength) can be arbitrarily adjusted by concentrations of these materials. Moreover, it is known that a wavelength in a specific region in which a light reflecting layer reflects light can be shifted by various factors in a production method, and the wavelength can be shifted by conditions such as temperature, luminous intensity, and irradiation time, when fixing a cholesteric liquid crystalline phase, in addition to addition amounts of a chiral agent or the like.

In the above-described (1) step, first, on the surface of the substrate or the light reflecting layer of a lower layer, the above-described curable liquid crystal composition is applied. The above-described curable liquid crystal composition is preferably prepared as an application liquid in which materials are dissolved or dispersed in a solvent. The application of the above-described application liquid can be performed by various methods such as a wire bar coating method, an extrusion coating method, a direct gravure coating method, a reverse gravure coating method and a die coating method. Furthermore, the liquid crystal composition can also be discharged from a nozzle by using an inkjet apparatus to thereby form a coating film.

Next, the curable liquid crystal composition applied on the surface and serving as a coating film is put into a state of a cholesteric liquid crystalline phase. In an embodiment in which the above-described curable liquid crystal composition is prepared as an application liquid containing a solvent, there are cases where the state of a cholesteric liquid crystalline phase can be achieved by drying a coating film and removing the solvent. In addition, in order to achieve the transition temperature to the cholesteric liquid crystalline phase, if desired, the above-described coating film may be heated. For example, the state of the cholesteric liquid crystalline phase can be stably achieved by once heating of the film to a temperature of an isotropic phase, and, after that, cooling or the like of it to the transition temperature to the cholesteric liquid crystalline phase. The transition temperature of the above-described curable liquid crystal composition to a liquid crystalline phase is preferably within a range of 10 to 250° C., more preferably within a range of 10 to 150° C. from the viewpoint of production suitability or the like. When the transition temperature is less than 10° C., in order to lower the temperature to a temperature range that leads to the liquid crystalline phase, a cooling step or the like may become necessary. On the other hand, when the transition temperature exceeds 200° C., a high temperature is required in order to lead once to an isotropic liquid state requiring a temperature higher than the temperature range leading to the liquid crystalline phase, which is disadvantageous from the viewpoint of a waste of heat energy, deformation or degeneration of a substrate, and the like.

Next, in the (2) step, ultraviolet rays are irradiated to the coating film that has been put into a state of a cholesteric liquid crystalline phase to thereby progress a curing reaction. For the irradiation with ultraviolet rays, a light source such as an ultraviolet lamp is used. In the step, by the irradiation with ultraviolet rays, the curing reaction of the liquid crystal composition progresses, and the cholesteric liquid crystalline phase is fixed and the light reflecting layer is formed.

Irradiation energy of ultraviolet rays is not particularly limited, but generally, about 100 mJ/cm$^2$ to 800 mJ/cm$^2$ is preferable. Furthermore, a time period of irradiating the coating film with ultraviolet rays is not particularly limited, but the time will be determined from both viewpoints of sufficient strength of a hardened film and productivity.

In order to accelerate a curing reaction, ultraviolet ray irradiation may be performed under heated conditions. In addition, the temperature in ultraviolet ray irradiation is preferably maintained within a temperature range in which a cholesteric liquid crystalline phase is exhibited so that the cholesteric liquid crystalline phase is not disturbed. Furthermore, the oxygen concentration in an atmosphere takes part in a polymerization degree, and in the case where an intended polymerization degree is not achieved in the air and the film strength is insufficient, preferably the oxygen concentration in the atmosphere is lowered by a method of nitrogen substitution or the like. As to a preferable oxygen concentration, 10% or less is preferable, 7% or less is more preferable and 3% or less is most preferable. The reaction ratio of a curing reaction (for example, polymerization reaction) advanced by ultraviolet ray irradiation is preferably 70% or more, more preferably 80% or more and further more preferably 90% or more, from the viewpoint of preservation of mechanical strength of the layer or the like and suppression of outflow of unreacted materials from the layer. In order to improve the reaction ratio, a method of increasing the irradiation amount of ultraviolet rays with which irradiation is performed, and polymerization under a nitrogen atmosphere or heated conditions are effective. Furthermore, a method of holding the product in a state of a temperature higher than a polymerization temperature to thereby further progress the reaction by a thermal polymerization reaction, or a method of performing ultraviolet ray irradiation once again (however, the irradiation is performed by conditions satisfying the conditions of the present invention), after once performing the polymerization, can also be used. The measurement of the reaction rate can be performed by comparing the absorption intensity of an infrared vibration spectrum of a reactive group (for example, polymerizable group) before and after the reaction progress.

In the above-described step, the cholesteric liquid crystalline phase is fixed and the light reflecting layer is formed. Here, as a state in which a liquid crystalline phase has been "fixed," a state in which the alignment of a liquid crystal compound having become a cholesteric liquid crystalline phase is maintained, is the most typical and preferable embodiment. The state is not limited only to it, but specifically, a state in which the layer does not show a flow property within a temperature range of usually 0° C. to 50° C. or −30° C. to 70° C. under severer conditions and can continue to keep stably a fixed alignment shape without generating a change in the alignment shape by an external field or an external force, is assumed to be meant. In the present invention, the alignment state of a cholesteric liquid crystalline phase is fixed by a curing reaction progressed by ultraviolet ray irradiation.

Note that, in the present invention, it is sufficient that optical properties of a cholesteric liquid crystalline phase is kept in the layer, and it is unnecessary any more that a liquid crystal composition in the light reflecting layer finally shows liquid crystalline properties. For example, a liquid crystal composition may have been made into high molecular weight by a curing reaction and have already lost liquid crystalline properties.

<Laminated Intermediate Film Sheet for Glass>

A laminated intermediate film sheet for glass containing the heat ray cutting film of the present invention is characterized by containing the heat ray cutting film of the present invention and an intermediate film sheet arranged on the at least one outermost layer of the heat ray cutting film.

(Properties of Laminated Intermediate Film Sheet for Glass)

The intermediate film sheet can be stuck to one surface and/or both surfaces of the heat ray cutting film of the present invention. The laminated intermediate film sheet for glass preferably has intermediate film sheets on both outermost layers, respectively, of the infrared light reflecting layer or the heat ray cutting film. The intermediate film sheet can be easily incorporated into the laminated glass as the laminated intermediate film sheet for laminated glass, by sticking the intermediate film sheet. When sticking the intermediate film sheet, the intermediate film sheet may be stuck with the substrate remained or may be stuck after the substrate is peeled off, but when considering that the film sheet will be incorporated into the laminated glass in a post-process, the film sheet is preferably stuck with the intermediate film sheet after the substrate is peeled off in consideration of the thickness, flexibility and compression resistance.

General intermediate film sheets used for making a laminated glass can be utilized as the intermediate film sheet. Specific examples thereof include a sheet or the like made from a composition containing a polyvinyl butyral resin or an ethylene-vinyl acetate copolymer as a main raw material.

The thickness of the intermediate film sheet is generally about 380 to 760 μm.

<Method for Producing Laminated Intermediate Film Sheet for Glass>

The heat ray cutting film of the present invention can be formed into a laminated intermediate film sheet for laminated glass sandwiched by intermediate film sheets, by being stuck with intermediate film sheets on both surfaces.

The method for producing the laminated intermediate film sheet for glass is a production method including at least:

(1) a first step of sticking a first intermediate film sheet to one surface of a heat ray cutting film to thereby give a first laminated body, and (2) a second step of sticking a second intermediate film sheet to the surface of the first laminated body on the side opposite to the surface to which the first intermediate film sheet is stuck. The first and second steps may be performed sequentially or may be performed simultaneously. In addition, after performing one step, the intermediate product may be once stored or conveyed and then the other process may be performed.

For sticking with the intermediate film sheet, a known sticking method can be used, and the use of a lamination processing is preferable. When the lamination processing is performed such that the heat ray cutting film and the intermediate film sheet are not peeled off from each other after working, the lamination processing is preferably performed under conditions of certain degree of heating and pressurization.

For performing stably the lamination, the temperature on the film surface side to which the intermediate film sheet adheres is preferably 50 to 130° C., more preferably 70 to 100° C.

At the time of the lamination, pressurization is preferable. The pressurization condition is preferably less than 2.0 kg/cm$^2$, more preferably within a range of 0.5 to 1.8 kg/cm$^2$, and further more preferably within a range of 0.5 to 1.5 kg/cm$^2$.

Furthermore, in the present invention, simultaneously with the lamination, or directly after or directly before the same, the substrate (or a laminated body including at least the substrate) may be peeled off from the heat ray cutting film. That is, a laminated intermediate film sheet obtained after the lamination may not have the substrate. For example, an example of methods for producing the laminated intermediate film sheet for laminated glass is a method for producing a laminated intermediate film sheet for glass using a heat ray cutting film in which a substrate is arranged only on one surface as the heat ray cutting film, including, in the first step, a step of sticking the first intermediate film sheet to the surface on the side opposite to the surface on which the substrate of the heat ray cutting film is arranged, and simultaneously with or after the step, peeling the substrate included in the heat ray cutting film to form the first laminated body, and, in the second step, sticking the second intermediate film sheet to the surface of the first laminated body obtained by peeling of the substrate.

According to the method, a laminated intermediate film sheet for glass not including a substrate can be produced, and by using the laminated intermediate film sheet for glass, an infrared reflective laminated glass not including a substrate can easily be made. In order to stably peel a substrate without a damage or the like, a temperature when a substrate is peeled off from the light reflecting layer of a cholesteric liquid crystalline phase is preferably 40° C. or more, more preferably 40 to 60° C.

[Laminated Glass]

The laminated glass of the present invention is characterized by including two glasses, and the laminated intermediate film sheet for glass of the present invention included between the two glasses.

(Configuration of Laminated Glass)

The laminated intermediate film sheet for laminated glass can be made into a laminated glass by being sandwiched between two glass plates. General glass plates can be utilized as the glass plate. In order to improve heat shielding performance by being combined with the heat ray cutting film using a cholesteric liquid crystalline phase of the present invention, a heat ray absorbing glass having an absorption in the visible light region can be utilized. It is possible to adjust visibility (transmittance) as glass and heat shielding performance by adjustment of the absorption in the visible light region. In a heat ray absorbing glass, as described in Japanese Patent Nos. 2544035, 2617223, or the like, absorption in the visible light region and color as transmitted light can be adjusted by incorporating an oxide of a metal such as iron, tin, nickel, cobalt or selenium. For example, when the heat ray absorbing glass is used as a front glass for automobiles, it is preferable, as a laminated glass, to enhance heat shielding performance while suppressing absorption in the visible light region so as to satisfy "visible light transmittance (standard light source A) of 70% or more" prescribed in JIS-R-3211 and adjusting color of transmitted light. As a heat ray absorbing glass, one having visible light transmittance (standard light source A) of within a range of 80 to 95% and a main wavelength measured using the standard light source A within a range of 495 to 560 nm is preferable.

The thickness of a glass plate is not particularly limited, and a preferable range thereof varies depending on the use applications. For example, in the use application for a front glass of transportation vehicles (window shield), generally, the use of a glass plate having a thickness of 2.0 to 2.3 mm is preferable. Furthermore, in the use applications for heat shielding window materials for architecture such as houses and buildings, generally, the use of a glass plate having a thickness of about 40 to 300 μm is preferable. However, the thickness is not limited within the above range.

A laminated body sandwiched between glass plates may have a configuration of glass plate/intermediate film/substrate/light reflecting layer obtained by fixing a cholesteric liquid crystal/optically-anisotropic layer having a phase difference of ½ wavelength/light reflecting layer obtained by fixing a cholesteric liquid crystal/substrate/intermediate film/glass plate, laminated in this order.

Furthermore, using one obtained by peeling a substrate (a PET film etc. used in film formation other than an optically-anisotropic layer having a phase difference of ½ wavelength) from the heat ray cutting film, it may have a configuration of glass plate/intermediate film/light reflecting layer obtained by fixing a cholesteric liquid crystal/optically-anisotropic layer having a phase difference of ½ wavelength/light reflecting layer obtained by fixing a cholesteric liquid crystal/intermediate film/glass plate, laminated in this order.

At this time, helical directions of liquid crystalline phases obtained by fixing cholesteric liquid crystals lying on both surfaces of the optically-anisotropic layer having a phase difference of ½ wavelength are desirably the same direction each other for those having the same reflection center wavelength.

[Method for Producing Laminated Glass]

The laminated intermediate film sheet for laminated glass can be made into a laminated glass by being sandwiched between two glass plates.

A production method of the laminated glass preferably includes a step of sandwiching the laminated intermediate film sheet for laminated glass between two glass plates to thereby produce a laminated body sandwiched between glass plates, and pressure-bonding the laminated body sandwiched between the glass plates with heating.

Known methods for producing a laminated glass can appropriately be used as a detailed production method.

Generally, after inserting the laminated intermediate film sheet for laminated glass between two glass plates, a method is adopted in which a heat treatment and pressurizing treatment (such as squeezing it with a rubber roller) are repeated several times, and at the end, a heat treatment is performed under a pressurized condition utilizing an autoclave and the like.

A laminated body in which the aforementioned two intermediate films are sandwiched between the glass plates not in contact with each other is preferably pressure-bonded with heating.

As to the sticking of the laminated body sandwiched between glass plates and the glass plate, for example, the laminated body and the glass plate are temporarily pressure-bonded at a temperature of 80 to 120° C. for 30 to 60 minutes under a reduced pressure with a vacuum bag or the like, and, after that, are stuck to each other in a autoclave at a temperature of 120 to 150° C. under an applied pressure of 1.0 to 1.5 MPa to thereby form a laminated glass, in which the laminated body is sandwiched between two glasses. Furthermore, the laminated body and the glass plate may be stuck using a sticky material and the like.

At this time, the time of heated pressure bonding at a temperature of 120 to 150° C. under an applied pressure of 1.0 to 1.5 MPa is preferably 20 to 90 minutes.

After the end of the heated pressure bonding, a cooling procedure is not particularly limited. The cooling may be carried out while appropriately releasing the pressure to thereby give a laminated glass body. In the present invention, after the end of heated pressure bonding, it is preferable to lower temperature in a state of maintaining the pressure from the viewpoint of further avoiding wrinkles and cracks of a laminated glass body to be obtained. Here, the lowering of the temperature in a state of maintaining the pressure means lowering temperature such that an internal pressure of an apparatus in the heated pressure bonding (preferably 130° C.) becomes 75% to 100% of that in the heated pressure bonding at 40° C. Methods for lowering the temperature in a state of maintaining the pressure are not particularly limited as long as the pressure is within the above-described range when the temperature is lowered to 40° C., but an embodiment in which the temperature is lowered without leaking the pressure from the inside of the apparatus so that the pressure in the pressure apparatus lowers spontaneously as the temperature lowers, or an embodiment in which the temperature is lowered with pressure furthermore applied from the outside so that the internal pressure of the apparatus does not lower as the temperature lowers, is preferable. In the case where the temperature is lowered in the state of maintaining the pressure, cooling to 40° C. is preferably carried out in 1 to 5 hours, after performing the heated pressure bonding at 120 to 150° C.

After the temperature is lowered in a state of maintaining the pressure, then a process of releasing the pressure is preferably performed. Specifically, after lowering the temperature in a state of maintaining the pressure, preferably the pressure is released after the temperature in the autoclave becomes 40° C. or less and the temperature is lowered.

From the above, the method for producing a laminated glass body preferably includes steps of laminating the first glass, the first intermediate film, the infrared ray reflecting layer, the second intermediate film and the second glass in this order, after that, performing heated pressure bonding at a temperature of 120 to 150° C. while applying a pressure of 1.0 to 1.5 MPa, lowering the temperature in a state of maintaining the pressure, and releasing the pressure.

A range of subjecting the infrared light reflecting layer (or a heat ray cutting film) and the intermediate film to thermocompression bonding may be the whole area of the glass plate or may be only the peripheral part of the glass plate, and the thermocompression bonding in the peripheral part can further suppress the generation of wrinkles.

<Member for Window>

The heat ray cutting film of the present invention preferably may exhibit selective reflectivity properties having reflection peaks at 850 to 900 nm, 1010 to 1070 nm and 1190 to 1290 nm which correspond to the peaks of the solar light energy. Reflection plates of such properties are stuck to windows of constructions such as houses and buildings, or of vehicles such as automobiles as a member for shielding solar heat. Alternatively, the heat ray cutting film of the present invention can be subjected to the use applications as a member itself for shielding solar heat (such as a heat-shielding glass and a heat-shielding film).

Other important performances as a heat ray cutting film are transmittance for visible light and haze. A heat ray cutting film that exhibits preferable transmittance for visible light and haze can be provided by selecting materials and adjusting production conditions or the like, and depending on the use applications. For example, in an embodiment used for a use application with high transmittance for visible light, a heat ray cutting film in which transmittance for visible light is 90% or more and reflectivity of infrared satisfies the above-described reaction, can be made. The heat ray cutting film of the present invention, the laminated intermediate film sheet for glass and the laminated glass of the present invention are preferably used as window members for constructions or vehicles.

EXAMPLES

Hereinafter, characteristics of the present invention will be explained further specifically by giving Examples and Comparative Examples (note that Comparative Examples are not necessarily known techniques). Materials, use amounts, ratios, treatment contents, treatment procedures and the like shown in Examples below can be appropriately modified without departing from the gist of the present invention. Accordingly, the scope of the present invention should not be construed as being limited to the specific examples shown below.

Production Example

<Preparation of Application Liquid (Liquid Crystal Composition)>

Application liquids used for respective Examples and Comparative Examples were prepared.
(Preparation of Application Liquid for Light Reflecting Layer)

Each of application liquids (R1) and (L1) having compositions shown in Tables 1 and 2 was prepared.

TABLE 1

| Table of composition of application liquid (R1) | | |
|---|---|---|
| Material (kind) | Material name (manufacturer) | Amount |
| rod-like liquid crystalline compound | RM-257 (Merck) | 10.000 parts by mass |
| chiral agent | LC-756 (BASF) | adjusted according to targeted reflection wavelength |
| polymerization initiator | Irgacure 819 (Ciba Specialty Chemicals) | 0.419 parts by mass |
| alignment controlling agent | Compound 1 shown below | 0.016 parts by mass |
| solvent | 2-butanone (Wako Pure Chemical Industries, Ltd.) | 15.652 parts by mass |

TABLE 2

| Composition table of application liquid (L1) | | |
|---|---|---|
| Material (kind) | Material name (manufacturer) | amount |
| rod-like liquid crystalline compound | RM-257 (Merck) | 10.000 parts by mass |
| chiral agent | Compound 2 shown below | adjusted according to targeted reflection wavelength |
| polymerization initiator | Irgacure 819 (Ciba Specialty Chemicals) | 0.419 parts by mass |

TABLE 2-continued

| Composition table of application liquid (L1) | | |
|---|---|---|
| Material (kind) | Material name (manufacturer) | amount |
| alignment controlling agent | compound 1 shown below | 0.016 parts by mass |
| solvent | 2-butanone (Wako Pure Chemical Industries, Ltd.) | 15.652 parts by mass |

Alignment control agent: Compound 1 (compound described in Japanese Patent Laid-Open No. 2005-99248)

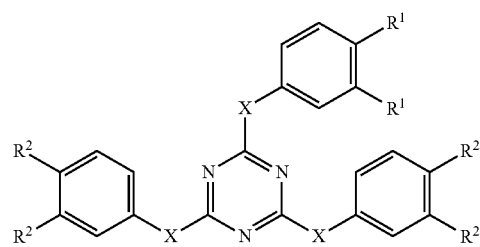

| $R^1$ | $R^2$ | X |
|---|---|---|
| $O(CH_2)_2O(CH_2)_2(CF_2)_6F$ | $O(CH_2)_2O(CH_2)_2(CF_2)_6F$ | NH |

Chiral agent: Compound 2 (compound described in Japanese Patent Laid-Open No. 2002-179668)

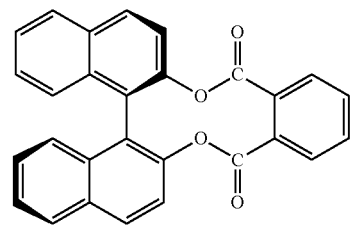

Furthermore, application liquids (R2) to (R7) were prepared in the same manner as that in the application liquid (R1), except for modifying the amount of the chiral agent LC-756. All of (R1) to (R7) were application liquids for right circularly-polarized light reflection, and the central reflection wavelengths thereof were as described in Table 3 below.

TABLE 3

| Application liquid (R1) to (R7) and central reflection wavelengths thereof | |
|---|---|
| Application liquid | Central reflection wavelength |
| application liquid (R1) | 720 nm |
| application liquid (R2) | 800 nm |
| application liquid (R3) | 850 nm |
| application liquid (R4) | 1000 nm |
| application liquid (R5) | 1100 nm |
| application liquid (R6) | 1200 nm |
| application liquid (R7) | 1450 nm |

Moreover, application liquids (L2) to (L7) were prepared in the same manner as that in the application liquid (L1), except for modifying the amount of the chiral agent (Compound 2). All of (L1) to (L7) were application liquids for left circularly-polarized light reflection and central reflection wavelengths were as described in Table 4 below.

TABLE 4

Application liquid (L1) to (L7) and central Reflection wavelengths thereof

| Application liquid | Central reflection wavelength |
|---|---|
| application liquid (L1) | 720 nm |
| application liquid (L2) | 800 nm |
| application liquid (L3) | 850 nm |
| application liquid (L4) | 1000 nm |
| application liquid (L5) | 1100 nm |
| application liquid (L6) | 1200 nm |
| application liquid (L7) | 1450 nm |

(Preparation of Application Liquid for Infrared Ray Absorbing Layer)

An application liquid (C) obtained by dispersing composite tungsten oxide microparticles was prepared. The composition of the application liquid (C) was as described in Table 5 below.

Note that an average particle diameter of cesium-containing tungsten oxide microparticles contained in a cesium-containing tungsten oxide dispersed liquid was measured using Zetasizer NanoZS (manufactured by Malvern) and was 30 nm.

TABLE 5

Composition table of application liquid (C)

| Material (kind) | Material name (manufacturer) | Amount |
|---|---|---|
| composite tungsten oxide | cesium-containing tungsten oxide dispersed liquid (Sumitomo Metal Mining Co., Ltd.) | 50.000 parts by mass |
| UV curable monomer | A-TMMT (Shin-Nakamura Chemical Co., Ltd.) | 5.000 parts by mass |
| polymerization initiator | Irgacure 819 (Ciba Specialty Chemicals) | 0.400 parts by mass |
| solvent | methyl isobutyl ketone (Wako Pure Chemical Industries, Ltd.) | 44.600 parts by mass |

An application liquid (C') obtained by dispersing composite tungsten oxide microparticles was prepared by addition of a light stabilizer Hostavin N30 among an IR pigment, a color tone adjusting agent, a UV absorber, a light stabilizer and an oxidation inhibitor, in 3 parts by mass, to the application liquid (C) prepared as described above.

An application liquid (C") obtained by dispersing composite tungsten oxide microparticles was prepared in the samemanner as the preparation of the application liquid (C), except for replacing the cesium-containing tungsten oxide dispersed liquid with a tungsten oxide dispersed liquid (manufactured by Sukgyung AT Co., Ltd.) having cesium-containing tungsten oxide of 100 nm in an average particle diameter.

Similarly, an application liquid (C'") obtained by dispersing composite tungsten oxide microparticles was prepared in the same manner as the preparation of the application liquid (C), except for replacing the cesium-containing tungsten oxide dispersed liquid with a tungsten oxide dispersed liquid (manufactured by Sukgyung AT Co., Ltd.) having cesium-containing tungsten oxide of 400 nm in an average particle diameter.

An ITO paint (trade name: PI-3, manufactured by Mitsubishi Materials Electronic Chemicals Co., Ltd.) was used as an application liquid (D) obtained by dispersing indium tin oxide (ITO) microparticles.

Example 1

<Formation of Light Reflecting Layer>

A heat ray cutting film was prepared using prepared application liquids (R2) and (L2), according to a procedure described below. A PET film manufactured by FUJIFILM Corporation (no undercoating layer, thickness: 75 μm) was used as a substrate.

(1) Each application liquid was applied onto a PET film using a wire bar at room temperature so as to give a thickness of 3.5 μm after drying.

(2) After removal of the solvent by drying the applied liquid at room temperature for 30 seconds, the substance was dried in an atmosphere of 125° C. for 2 minutes, and then, was made to be a cholesteric liquid crystalline phase at 95° C. Subsequently, the cholesteric liquid crystalline phase was irradiated with UV by using an electrodeless lamp "D bulb" (90 mW/cm$^2$) manufactured by Fusion UV Systems, Inc. with an output of 60% for 6 to 12 seconds, and was fixed to thereby form a film (light reflecting layer).

(3) After being cooled to room temperature, two light reflecting layers obtained by fixing cholesteric liquid crystalline phases on the substrate were laminated by repetition of the processes (1) and (2).

Note that application liquids were applied in order from the application liquids described at the upper portion in Table 6 below.

<Formation of Infrared Ray Absorbing Layer>

The application liquid (C) was applied at room temperature onto the second cholesteric liquid crystal film (light reflecting layer X2) formed as described above using a wire bar such that a thickness after drying became 2 μm. After the solvent was removed by performing drying at room temperature for 90 seconds, heating was performed in an atmosphere of 90° C. for 90 seconds. Subsequently, UV irradiation was performed with an electrodeless lamp "D bulb" (90 mW/cm$^2$) manufactured by Fusion UV Systems with an output of 60% for 3 to 6 seconds, and an infrared ray absorbing film in which composite tungsten oxide microparticles was dispersed in an ultraviolet curing resin was laminated.

In this manner, a heat ray cutting film of Example 1, in which two light reflecting layers on a substrate and the infrared ray absorbing layer further on the second light reflecting layer were laminated, was prepared.

Examples 2 to 7

Heat ray cutting films of Examples 2 to 7 were made in the same procedure as that in Example 1, except for modifying the application liquid to be applied and the number of lamination layers in the formation of a light reflecting layer, as described in Table 6 below.

Comparative Example 1

A heat ray cutting film of Comparative Example 1 was prepared in the same procedure as that in Example 1, except for modifying the application liquid to be applied in the formation of a light reflecting layer, as described in Table 7 below, and for omitting the lamination of an infrared absorbing layer. However, when a dry thickness of a light reflecting layer was larger than 6 μm, a light reflecting layer larger than 6 μm was formed under conditions of room-temperature drying for 60 seconds and an atmosphere at 125° C. for 3 minutes (UV curing time was the same).

Comparative Example 2

A heat ray cutting film of Comparative Example 2 was produced in the same manner as that in Example 1, except for modifying the application liquid to be applied in the formation of a light reflecting layer, as described in Table 7 below, and for using an application liquid (D) in the formation of an infrared ray absorbing layer.

Comparative Examples 3 and 4

Heat ray cutting films of Comparative Examples 3 and 4 were made in the same procedure as that in Example 1, except for modifying the application liquid to be applied and the lamination number in the formation of a light reflecting layer, as described in Table 7 below.

Comparative Example 5

A heat ray cutting film of Comparative Example 5 was prepared in the same procedure as that in Example 1, except for modifying the film thickness in the formation of a light reflecting layer to thereby modify reflectivity of the second light reflecting layer in 800 to 1100 nm as described in Table 7 below.

Comparative Example 6

A heat ray cutting film of Comparative Example 6 was prepared in the same procedure as that in Example 1, except for using only the application liquid (R2) in the formation of the light reflecting layer to thereby modify the lamination number of the light reflecting layer to 1.

Comparative Example 7

A heat ray cutting film of Comparative Example 7 was prepared in the same procedure as that in Example 1, except for laminating an infrared ray absorbing layer having a thickness of 3.5 μm on the substrate without forming a light reflecting layer.
<Evaluation of Heat Ray Cutting Film>
(Transmittance at 850 nm and the Maximum Reflectivity in 800 to 1100 nm)

As to each of heat ray cutting films having been made, a reflection spectrum and a transmission spectrum were measured through the use of a spectrophotometer "V-670" manufactured by Jasco Corporation, and the transmittance at 850 nm and the maximum reflectivity in 800 to 1100 nm were obtained.

Results are shown in Tables 6 and 7 below.
(Visible Light Transmittance)

A reflection spectrum and a transmission spectrum were measured through the use of a spectrophotometer "V-670" manufactured by Jasco Corporation, and calculation was performed on the basis of the visible light calculation method described in JIS A5759.

Results are shown in Tables 6 and 7.
The visible light transmittance is required to be 70% or more.
(Shielding Factor)

A reflection spectrum and a transmission spectrum were measured through the use of a spectrophotometer "V-670" manufactured by Jasco Corporation, and calculation was performed on the basis of the calculation method of the shielding factor described in JIS A5759.

Results are shown in Tables 6 and 7 below.
The shielding factor is required to be 0.65 or less.
(Haze)

Haze was measured in conformity with JIS K 7136:2000 (Plastics-Determination of haze for transparent materials).
Results are shown in Tables 6 and 7.
The haze is required to be 1.0% or less.

TABLE 6

| | | Configuration of heat ray cutting film | | | | | | | | | | |
|---|---|---|---|---|---|---|---|---|---|---|---|---|
| | | Light reflecting layer obtained by fixing a cholesteric liquid-crystalline phase | | | | Infrared ray absorbing layer | | | | | | |
| | | Configuration contents | | | Maximum reflectance in 800 to 1100 nm [%] | Composition of application liquid containing oxide microparticles | Particle diameter of oxide microparticles [μm] | | Properties of heat ray cutting film | | | |
| | Number of layers | (application liquid, reflecting circularly polarized light) | Center wavelength [nm] | Film thickness [μm] | | | | Film thickness [μm] | 850 nm transmittance [%] | Visible light transmittance [%] | Shielding factor [—] | Haze [%] |
| Example 1 | 2 | First layer (R2), Right circularly polarized light | 800 | 3.5 | 81 | Application liquid (C) containing cesium-containing tungsten oxide | 30 | 2 | 5 | 72 | 0.61 | 0.65 |
| | | Second layer: (L2), Left circularly polarized light | 800 | 3.5 | | | | | | | | |
| Example 2 | 2 | First layer (R3), Right circularly polarized light | 850 | 4.5 | 89 | Application liquid (C) containing cesium-containing tungsten oxide | 30 | 2 | 2.3 | 75 | 0.6 | 0.63 |
| | | Second layer: (L3), Left circularly polarized light | 850 | 4.5 | | | | | | | | |
| Example 3 | 2 | First layer: (R5), Right circularly polarized light | 1100 | 6 | 91 | Application liquid (C) containing | 30 | 2 | 10.1 | 75 | 0.63 | 0.67 |
| | | Second layer: (L5), Left | 1100 | 6 | | | | | | | | |

TABLE 6-continued

| | | Configuration of heat ray cutting film | | | | | | | | | |
|---|---|---|---|---|---|---|---|---|---|---|---|
| | | Light reflecting layer obtained by fixing a cholesteric liquid-crystalline phase | | | | Infrared ray absorbing layer | | | Properties of heat ray cutting film | | |
| | | Configuration contents | | | Maximum reflectance in 800 to 1100 nm [%] | Composition of application liquid containing oxide microparticles | Particle diameter of oxide microparticles [μm] | | | | |
| | Number of layers | (application liquid, reflecting circularly polarized light) | Center wavelength [nm] | Film thickness [μm] | | | | Film thickness [μm] | 850 nm transmittance [%] | Visible light transmittance [%] | Shielding factor [—] | Haze [%] |
| | | circularly polarized light | | | | cesium-containing tungsten oxide | | | | | |
| Example 4 | 3 | First layer (R3), Right circularly polarized light | 850 | 4.5 | 88 | Application liquid (C) containing cesium-containing tungsten oxide | 30 | 2 | 2.2 | 75 | 0.59 | 0.72 |
| | | Second layer (R4), Right circularly polarized light | 1000 | 5.5 | | | | | | | |
| | | Third layer: (L3), Left circularly polarized light | 850 | 4.5 | | | | | | | |
| Example 5 | 2 | First layer (R2), Right circularly polarized light | 800 | 3.5 | 81 | Application liquid (C') containing cesium-containing tungsten oxide and additive | 30 | 2 | 5 | 72 | 0.61 | 0.7 |
| | | Second layer (L2), Left circularly polarized light | 800 | 3.5 | | | | | | | |
| Example 6 | 3 | First layer (R3), Right circularly polarized light | 850 | 4.5 | 88 | Application liquid (C") containing tungsten oxide | 100 | 2 | 1.9 | 71.9 | 0.59 | 0.77 |
| | | Second layer (R4), Right circularly polarized light | 1000 | 5.5 | | | | | | | |
| | | Third layer: (L3), Left circularly polarized light | 850 | 4.5 | | | | | | | |
| Example 7 | 3 | First layer (R3), Right circularly polarized light | 850 | 4.5 | 88 | Application liquid (C") containing tungsten oxide | 400 | 2 | 1.5 | 70.4 | 0.58 | 0.91 |
| | | Second layer (R4), Right circularly polarized light | 1000 | 5.5 | | | | | | | |
| | | Third layer (L3), Left circularly polarized light | 850 | 4.5 | | | | | | | |

TABLE 7

| | | Configuration of heat ray cutting film | | | | | | | | | |
|---|---|---|---|---|---|---|---|---|---|---|---|
| | | Light reflecting layer obtained by fixing a cholesteric liquid-crystalline phase | | | | Infrared ray absorbing layer | | | Properties of heat ray cutting film | | |
| | | Configuration contents | | | Maximum reflectance in 800 to 1100 nm [%] | Composition of application liquid containing oxide microparticles | Particle diameter of oxide microparticles [μm] | | | | |
| | Number of layers | (application liquid, reflecting circularly polarized light) | Center wavelength [nm] | Film thickness [μm] | | | | Film thickness [μm] | 850 nm transmittance [%] | Visible light transmittance [%] | Shielding factor [—] | Haze [%] |
| Comparative Example 1 | 8 | First layer: (R3), Right circularly polarized light | 850 | 4.5 | 89 | absent | — | — | 5.2 | 75 | 0.61 | 2.31 |
| | | Second layer. (R4), Right circularly polarized light | 1000 | 5.5 | | | | | | | |
| | | Third layer: (R6), Right circularly polarized light | 1200 | 7 | | | | | | | |
| | | Fourth layer: (R7), Right circularly polarized light | 1450 | 10 | | | | | | | |
| | | Fifth layer: (L3), Left circularly polarized light | 850 | 4.5 | | | | | | | |
| | | Sixth layer: (L4), Left circularly polarized light | 1000 | 5.5 | | | | | | | |
| | | Seventh layer: (L6), Left circularly polarized light | 1200 | 7 | | | | | | | |

TABLE 7-continued

| | | Configuration of heat ray cutting film | | | | | | Properties of heat ray cutting film | | | |
|---|---|---|---|---|---|---|---|---|---|---|---|
| | | Light reflecting layer obtained by fixing a cholesteric liquid-crystalline phase | | | | Infrared ray absorbing layer | | | | | |
| | | Configuration contents | | | Maximum reflectance in 800 to 1100 nm [%] | Composition of application liquid containing oxide microparticles | Particle diameter of oxide microparticles [μm] | | | | |
| | Number of layers | (application liquid, reflecting circularly polarized light) | Center wavelength [nm] | Film thickness [μm] | | | | Film thickness [μm] | 850 nm transmittance [%] | Visible light transmittance [%] | Shielding factor [—] | Haze [%] |
| | | Eighth layer. (L7), Left circularly polarized light | 1450 | 10 | | | | | | | | |
| Comparative Example 2 | 4 | First layer (R3), Right circularly polarized light | 850 | 4.5 | 89 | Indium-tin oxide | — | 2 | 5.1 | 75 | 0.6 | 1.21 |
| | | Second layer (R5), Right circularly polarized light | 1000 | 5.5 | | | | | | | | |
| | | Third layer (L3), Left circularly polarized light | 850 | 4.5 | | | | | | | | |
| | | Fourth layer (L5), Left circularly polarized light | 1000 | 5.5 | | | | | | | | |
| Comparative Example 3 | 2 | First layer: (R1), Right circularly polarized light | 720 | 2 | 80 | Application liquid (C) containing cesium-containing tungsten oxide | 30 | 2 | 142 | 68 | 0.65 | 0.66 |
| | | Second layer: (L1), Left circularly polarized light | 720 | 2 | | | | | | | | |
| Comparative Example 4 | 2 | First layer: (R6), Right circularly polarized light | 1200 | 7 | 83 | Application liquid (C) containing cesium-containing tungsten oxide | 30 | 2 | 15 | 75 | 0.68 | 0.82 |
| | | Second layer (L6), Left circularly polarized light | 1200 | 7 | | | | | | | | |
| Comparative Example 5 | 2 | First layer (R3), Right circularly polarized light | 850 | 2 | 43 | Application liquid (C) containing cesium-containing tungsten oxide | 30 | 2 | 13.2 | 75 | 0.67 | 0.58 |
| | | Second layer (L3), Left circularly polarized light | 850 | 2 | | | | | | | | |
| Comparative Example 6 | 1 | First layer (R3), Right circularly polarized light | 850 | 0.5 | 45 | Application liquid (C) containing cesium-containing tungsten oxide | 30 | 2 | 12.4 | 75 | 0.67 | 0.59 |
| Comparative Example 7 | absent | — | — | — | — | Application liquid (C) containing cesium-containing tungsten oxide | 30 | 3.5 | 5.1 | 66 | 0.6 | 0.42 |

As shown in Tables 6 and 7 above, in heat ray cutting films having layer configurations in respective Examples, haze can be lowered while maintaining the shielding factor in the conventional configuration. Furthermore, it was found that the application number at the time of production and cost of raw materials were able to be reduced.

On the other hand, from Comparative Example 1, it was found that, in a film not having an infrared ray absorbing layer containing composite tungsten oxide microparticles, haze became high when a shielding factor is maintained to be 0.65 or less.

From Comparative Examples 2, it was found that, in a film using an infrared ray absorbing layer having mainly ITO as an infrared ray absorbing layer, haze became high when a shielding factor is maintained to be 0.65 or less.

From Comparative Examples 3, it was found that visible light was reflected and the visible light transmittance became low, in the case where the center wavelength of a light reflecting layer obtained by fixing a cholesteric liquid crystal layer fell below the lower limit prescribed in the present invention.

From Comparative Examples 4, it was found that infrared light transmittance at 850 nm became high and a shielding factor also became high, in the case where the central wavelength of a light reflecting layer obtained by fixing a cholesteric liquid crystal layer exceeded the upper limit prescribed in the present invention.

From Comparative Examples 5, it was found that infrared light transmittance at 850 nm became high and a shielding factor also became high, in the case where the thickness of a light reflecting layer was adjusted to make the maximum reflectivity in 800 to 1100 nm be 80% or less.

From Comparative Examples 6, it was found that infrared light transmittance at 850 nm became high and a shielding factor also became high, in a film having one light reflecting layer obtained by fixing a cholesteric liquid crystal layer.

From Comparative Examples 7, it was found that haze became high, when a shielding factor is maintained to be 0.65 or less only with an infrared light absorbing layer containing composite tungsten oxide microparticles without providing a light reflecting layer obtained by fixing a cholesteric liquid crystal layer.

Example 11

<Production of Heat Ray Cutting Member for Sticking to Windows of Constructions or Vehicles>

A highly transparent adhesive transfer tape (base material-less adhesive (sticky material), thickness: 25 μm) manufactured by Sumitomo 3M Ltd. was stuck on the PET film side of the heat ray cutting films of respective Examples and thus a heat ray cutting film with an adhesive was prepared.

When the heat ray cutting film with an adhesive having been made was used as a heat ray cutting member for being stuck to windows of constructions or vehicles and was stuck to a rear glass of an automobile, it was found that the heat ray cutting film was stuck without a remarkable defect or stripe.

Examples 21

<Production of Heat Ray Cutting Member and Laminated Glass for Front Glass of Vehicle>
(Preparation of Application Liquid for Easily Adhering Layer)

An application liquid for an easily adhering layer of a composition shown below was prepared.

| | |
|---|---|
| Polyvinyl butyral resin B1776 (manufactured by Choshun Kabushiki Kaisha (Taiwan)) | 10 parts by mass |
| Methoxypropyl acetate (PGMEA) | 100 parts by mass |
| Tinuvin 326 (manufactured by BASF, ultraviolet ray absorber) | 1 part by mass |

(Preparation of Heat Ray Cutting Member for Front Glass of Vehicle)

The application liquid for an easily adhering layer prepared as described above was applied onto the surfaces (both surfaces) of the heat ray cutting films in respective Examples, by using a wire bar so as to give a thickness after drying of 1.0 μm. After that, the resulting substance was heated at 150° C. for 10 minutes, dried and solidified, an easily adhering layer was formed, and a heat ray cutting film with an easily adhering layer was prepared.

The resulting product was utilized as a heat ray cutting member for a front glass of a vehicle.
(Preparation of Laminated Intermediate Film Sheet for Glass and Laminated Glass)

Next, the heat ray cutting film with the easily adhering layer made as described above was sandwiched with polyvinyl butyral intermediate film sheets (thickness: 380 μm) for laminated glass, which was subjected to a lamination treatment (heating temperature: 80° C., applied pressure: 1.5 kg/cm$^2$, conveyance sped: 0.1 m/min) using a laminator (manufactured by TAISEI LAMINATOR Co., LTD.) to thereby form a laminated intermediate film sheet for glass.

Subsequently, the laminated intermediate film sheet for glass made as above was sandwiched between two clear glasses (thickness: 2 mm), which was placed in a rubber bag and the pressure was reduced with a vacuum pump. After that, the temperature was increased to 90° C. under a reduced pressure, and after holding it for 30 minutes, the condition was once returned to ordinary temperature and pressure. After that, the film sheet was held in an autoclave under conditions of pressure of 1.3 MPa and temperature of 130° C. for 20 minutes. The condition was returned to ordinary temperature and pressure and thus a laminated glass with an infrared light reflecting function was prepared.

The performance of the laminated glass thus prepared was evaluated, and it was confirmed that the laminated glass functioned as an excellent heat shielding glass without a remarkable defect or stripe.

While the present invention has been described in detail and with reference to specific embodiments thereof, it will be apparent to one skilled in the art that various changes and modifications can be made therein without departing from the spirit and scope thereof. All the publications referred to in the present specification are expressly incorporated herein by reference in their entirety. The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

KEY TO THE NUMBERS

12: substrate
14a: light reflecting layer (light reflecting layer X1) obtained by fixing a cholesteric liquid crystalline phase
14b: light reflecting layer (light reflecting layer X2) obtained by fixing a cholesteric liquid crystalline phase
16a, 16b: light reflecting layer obtained by fixing a cholesteric liquid crystalline phase
20: infrared ray absorbing layer containing composite tungsten oxide microparticles

The invention claimed is:

1. A heat ray cutting film comprising a substrate, a light reflecting layer X1, a light reflecting layer X2, and an infrared ray absorbing layer in this order,
   the infrared ray absorbing layer comprising composite tungsten oxide microparticles,
   each of the light reflecting layer X1 and the light reflecting layer X2 being a layer obtained by fixing cholesteric liquid crystalline phase,
   the light reflecting layer X1 and the light reflecting layer X2 reflecting lights circularly polarized in directions opposite to each other, and
   reflection center wavelengths of the light reflecting layer X1 and the light reflecting layer X2 being substantially equal to each other within a range of 800 to 1100 nm,
   wherein the number of light reflecting layers is 2 or 3,
   wherein maximum reflectivity in 800 to 1100 nm of all light reflecting layers obtained by fixing cholesteric liquid crystalline phases is 80% or more,
   wherein the substrate and the light reflecting layer X1 are directly in contact and the light reflecting layer X2 and the infrared ray absorbing layer are directly in contact, (i) the light reflecting layer X1 and the light reflecting layer X2 are directly in contact; or (ii) the heat ray cutting film further comprises a light reflecting layer X3 made of a single layer wherein the light reflecting layer X3 is a layer obtained by fixing cholesteric liquid crystalline phase, the light reflecting layer X1 and the light reflecting layer X3 are directly in contact, and the light reflecting layer X3 and the light reflecting layer X2 are directly in contact, and wherein the light reflecting layer X3 reflects light circularly polarized in the same direction as the light reflecting layer X1, and reflection center wavelength of the light reflecting layer X3 is within a range of 800 to 1400 nm.

2. The heat ray cutting film according to claim 1, wherein the light reflecting layer X1 reflects right circularly-polarized light and the light reflecting layer X2 reflects left circularly-polarized light.

3. The heat ray cutting film according to claim 1, wherein the substrate is a plastic substrate.

4. The heat ray cutting film according to claim 1, wherein the composite tungsten oxide is represented by general formula (1) below:

$$M_xWO_y$$

M represents at least one kind selected from the group consisting of Cs, Na, Rb, K, Tl, In, Ba, Li, Ca, Sr, Fe and Sn, $0.1 \leq x \leq 0.5$, and $2.2 \leq y \leq 3.0$.

5. The heat ray cutting film according to claim 1, wherein the average particle diameter of the composite tungsten oxide microparticles is 5 to 500 nm.

6. The heat ray cutting film according to claim 1, wherein the infrared ray absorbing layer is a layer obtained by dispersing the composite tungsten oxide microparticles in an ultraviolet curable resin or a thermoplastic resin.

7. The heat ray cutting film according to claim 1, further comprising an adhering layer comprising polyvinyl butyral resin.

8. The heat ray cutting film according to claim 7, wherein the adhering layer comprises at least one kind of ultraviolet ray absorbers.

9. A laminated glass comprising two glass plates and the heat ray cutting film according to claim 1 sandwiched between the two glass plates.

10. A method of producing the heat ray cutting film according to claim 1, comprising a step of forming the light reflecting layer X1 by applying a curable liquid crystal composition comprising a curable cholesteric liquid crystal compound on a surface of the substrate, drying the applied curable liquid crystal composition, and progressing a curing reaction of the curable liquid crystal composition, and a step of forming the infrared ray absorbing layer by applying an application liquid comprising composite tungsten oxide microparticles on a surface of the light reflecting layer X2.

11. The method of producing a heat ray cutting film according to claim 10, comprising a step of forming the light reflecting layer X2 by applying a curable liquid crystal composition comprising a curable cholesteric liquid crystal compound on a surface of the light reflecting layer X1, drying the applied curable liquid crystal composition, and progressing a curing reaction of the curable liquid crystal composition.

12. The method of producing a heat ray cutting film according to claim 10, comprising a step of forming the light reflecting layer X2 by applying a curable liquid crystal composition comprising a curable cholesteric liquid crystal compound on a light reflecting layer X3 made of a single layer that is provided on a surface of the light reflecting layer X1, drying the applied curable liquid crystal composition, and progressing a curing reaction of the curable liquid crystal composition.

13. The heat ray cutting film according to claim 1, wherein the heat ray cutting film has a haze value of 1% or less.

14. The heat ray cutting film according to claim 1, wherein the heat ray cutting film has a visible light transmittance of 70% or more.

15. The heat ray cutting film according to claim 1, wherein the heat ray cutting film has a transmittance at 850 nm of 10% or less.

16. The heat ray cutting film according to claim 1, wherein the average particle diameter of the composite tungsten oxide microparticles is 5 to 30 nm.

* * * * *